(12) United States Patent
Knighton et al.

(10) Patent No.: US 12,399,865 B1
(45) Date of Patent: Aug. 26, 2025

(54) CONSTRUCTING BATCHES WITH DATALOADER WORKERS WITH DISJOINT SHARD DOWNLOADS

(71) Applicant: Databricks, Inc., San Francisco, CA (US)

(72) Inventors: James Douglas Knighton, Lakeside, CA (US); Karan Kishorkumar Jariwala, San Jose, CA (US); Saaketh Ram-Rachakonda Narayan, San Francisco, CA (US); Bandish Bimal Shah, San Francisco, CA (US); Abhinav Sai Venigalla, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/753,859

(22) Filed: Jun. 25, 2024

Related U.S. Application Data

(60) Provisional application No. 63/606,962, filed on Dec. 6, 2023.

(51) Int. Cl.
*G06F 16/16* (2019.01)
*G06F 16/11* (2019.01)
*G06F 16/176* (2019.01)

(52) U.S. Cl.
CPC .......... *G06F 16/164* (2019.01); *G06F 16/116* (2019.01); *G06F 16/176* (2019.01)

(58) Field of Classification Search
CPC .................................................. G06F 16/164
USPC ......................................................... 707/602
See application file for complete search history.

(56) References Cited

U.S. PATENT DOCUMENTS

| | | | |
|---|---|---|---|
| 11,657,317 B2 * | 5/2023 | Permeh ................. | G06N 20/00 706/12 |
| 2019/0251468 A1 * | 8/2019 | Guillame-bert .......... | G06N 7/01 |
| 2022/0067577 A1 * | 3/2022 | Serebryakov ............ | G06N 3/08 |

* cited by examiner

*Primary Examiner* — Syling Yen
(74) *Attorney, Agent, or Firm* — Fenwick & West LLP

(57) ABSTRACT

A data processing service accesses data files from data streams, each data file including samples to be processed for training a machine-learning model. The service converts the data files to discrete shard files, each shard file comprising a subset of samples. Each sample ID is mapped to a shard index of a respective shard file that includes the sample. The service may generate partition tensors that partition sample index spaces into a number of physical nodes, devices, workers, and batches. The service may shuffle the shard files and divide the sample IDs into a number of logical nodes and shuffle the sample IDs. The service generates shuffled sample ID arrays that map the sample indices to the sample IDs. During training, workers download disjoint shard files and map the assigned sample indices to corresponding batches of sample IDs based on the shuffled sample ID arrays.

20 Claims, 17 Drawing Sheets

US 12,399,865 B1

CONSTRUCTING BATCHES WITH DATALOADER WORKERS WITH DISJOINT SHARD DOWNLOADS

CROSS-REFERENCE TO RELATED APPLICATIONS

This application claims the benefit of and priority to U.S. Provisional Application No. 63/606,962, filed Dec. 6, 2023, which is hereby incorporated by reference in its entirety.

TECHNICAL FIELD

This disclosure relates generally to training machine-learned models, and more specifically to, using streaming datasets to perform distributed training for machine-learned models.

BACKGROUND

Large-scale machine-learned models have a significant number of parameters and often require large amounts of computing power as well as training data. Often times, multiple computing nodes each with multiple hardware accelerator devices (e.g., graphics processing units (GPU's) or tensor processing units (TPU's)) are used to perform distributed training to process data or model parameters in parallel. Loading training data becomes an escalating challenge as datasets grow larger in size and the number of nodes or machines scales. It is often difficult to train on large datasets from cloud storage in a manner that is fast, inexpensive, and scalable.

Many problems can arise when performing training of large-scale machine-learned models due to the complexity and scale of training data and parameters. For example, large-scale data is often stored in object storage on cloud platforms and multiple computing nodes are coordinated to perform distributed training. A computing node may crash, and it may be difficult to resume where the training process left off. Hardware accelerators in the computing nodes may be under-utilized while waiting for large dataset downloads, or higher egress fees may be paid when downloading redundant data across different machines. Training runs may be run with incorrect data partitioning across nodes.

Moreover, there are many ways to alter the results of training when doing distributed training. For example, the same data may be accidentally used to train on each machine or device, duplicating the same samples over again in each batch, which may impact model convergence. Another pitfall of some existing solutions is that the data ordering depends on the number of devices (e.g., GPU's or TPU's). This can create an issue where the training run cannot be reproduced when a user is debugging the training process on a single machine. In addition, changing the number of devices during a training run to deal with node failures or altered availability can change the semantics of training. For example, a single epoch training run could end up processing the same sample before and after changing the device count if the sample ordering is not deterministically preserved.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

Figure (FIG. 1 is a high-level block diagram of a system environment for a data processing service, in accordance with an embodiment.

DETAILED DESCRIPTION

Figure 1:
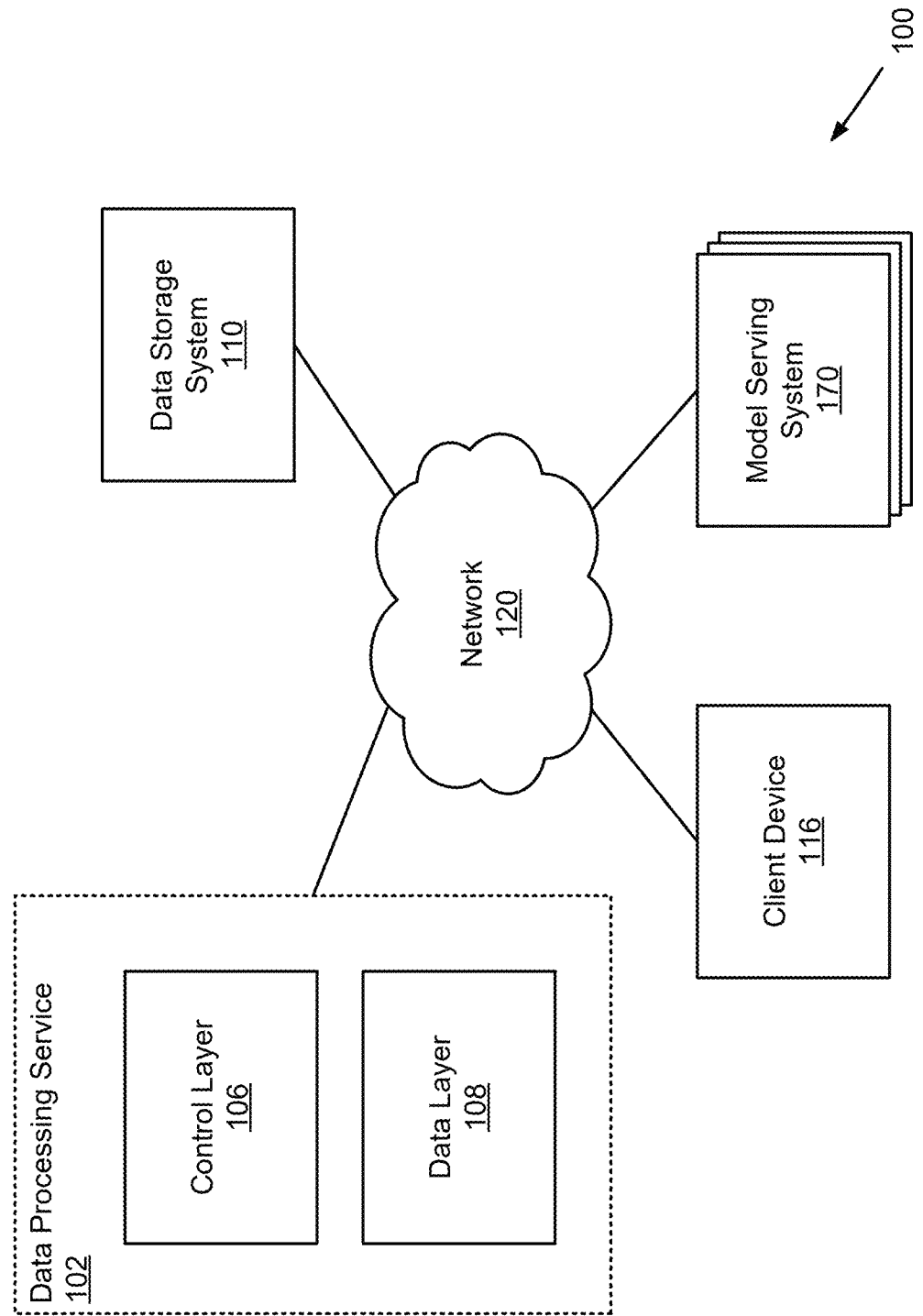

The figures depict various embodiments of the present configuration for purposes of illustration only. One skilled in the art will readily recognize from the following discussion that alternative embodiments of the structures and methods illustrated herein may be employed without departing from the principles of the configuration described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

The disclosed configurations provide a method (and/or a computer-readable medium or system) for using a streaming dataset object, and performing sample downloads using disjoint shard files for training a machine learning model. The configuration may access one or more data files from one or more data streams. Each data file includes a plurality of samples to be processed over one or more iterations of training a machine-learning model. Each sample may have a sample ID. The configuration may convert the one or more data files to one or more discrete shard files. Each shard file may include a respective subset of samples from the plurality of samples, and each sample ID is mapped to a shard index of a respective shard file that includes the sample. The configuration may access a first physical node and a second physical node, the first physical node having a first set of devices and the second physical node having a second set of devices. Each device is associated with one or more workers. The configuration performs the one or more iterations of training the machine-learning model. During the training process, workers of the first physical node download a first subset of shard files and workers of the second physical node download a second subset of shard files, and the first subset of shard files are disjoint from the second subset of shard files. There may be an exception of a few shard files that are split between nodes to ensure each node is assigned to the same number of samples.

The disclosed configurations further provide a method (and/or a computer-readable medium or system) for sample space partitioning, deterministic sample ordering, and elastic resumption. The configuration may obtain first sample indices for a first data stream and second sample indices for a second data stream and generate one or more partition tensors that partition a first sample index space and a second sample index space into a number of physical nodes, a number of devices per physical node, a number of workers per device, a number of batches per worker and a number of samples per batch. The one or more partition tensors assign each worker batches of sample indices from both the first data stream and the second data stream. The configuration may shuffle sample IDs of the first data stream and sample IDs of the second data stream to generate one or more shuffled sample ID arrays that map the sample indices to the corresponding sample IDs of the first data stream or the second data stream. For each worker, the configuration may map the sample indices assigned to the worker to corresponding batches of sample IDs based on the one or more shuffled sample ID arrays and perform one or more iterations of training a machine-learning model. During the training process, the workers download a shard file that includes assigned samples identified by the sample IDs.

The disclosed configurations further provide a method (and/or a computer-readable medium or system) for multiple datasets mixing. The configuration may access one or more shard files from one or more data streams. Each shard file includes a plurality of samples, each sample has a sample ID, and each sample ID is mapped to a shard index of a respective shard file that includes the sample. The configuration generates a partition tensor that partitions a sample index space into a number of physical nodes, a number of logical nodes, a number of devices per physical node, a number of workers per device, a number of batches per worker and a number of samples per batch. The partition tensor assigns each worker batches of sample indices. The configuration shuffles the one or more shard files and divides the sample IDs into the number of logical nodes and shuffles the sample IDs within each logical node. The configuration may generate a shuffled sample ID array that maps the sample indices to the corresponding sample IDs. For each worker, the configuration maps the sample indices assigned to the worker to corresponding batches of sample IDs based on the shuffled sample ID array and performs one or more iterations of training a machine-learning model. During the training process, the workers download the shard file that includes assigned samples identified by the sample IDs.

Figure (FIG. 1 is a high-level block diagram of a system environment 100 for a data processing service 102, in accordance with an embodiment. The system environment 100 shown by FIG. 1 includes one or more client devices 116A, 116B (collectively referred to as client device 116), a network 120, a data processing service 102, a data storage system 110, and one or more model serving system 170. In alternative configurations, different and/or additional components may be included in the system environment 100. The computing systems of the system environment 100 may include some or all of the components (systems (or subsystems)) of a computer system 1000 as described with FIG. 10.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning (ML) and artificial intelligence (AI) requests, and the like, on data stored by the data storage system 110. For example, an ML or AI request may be a prompt for execution by one or more machine-learned models. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

In one embodiment, components of the data processing service 102 creates a streaming dataset object that shuffles and distributes data samples up front, such that each data sample has a dedicated slot. Specifically, a streaming dataset object is created, and a data loader class iterates over the dataset in batches, which are then fed into the machine-learned model for processing. The streaming dataset object automatically loads disjoint samples across logical nodes, with deterministic sample ordering independent of the actual number of devices that are being used for training. Moreover, to get sufficient randomness in sample ordering, the streaming dataset object shuffles across all samples assigned to a node or machine, rather than only the samples assigned to one data loader process for one device.

Specifically, in existing training methods, training a large-scale machine-learning model (e.g., transformer-based large language models (LLM's) or image generation models) using computing nodes on cloud instances often requires users to wait a long time (e.g., tens of minutes) for the training data to download from an object storage bucket and/or an attached storage device. Moreover, the training process may require large egress fees when, for example, the data is stored in cloud object storage in one region, but training occurs in another region (perhaps with better GPU availability). Downloading a large-scale training dataset at the start of the training run will be expensive. In addition, if the training process is performed on multiple (e.g., four) nodes or machines at once, each node will download its own copy of the entire dataset, further multiplying costs.

In one embodiment, components of the data processing service 102 described herein configures one or more streaming dataset objects to reduce startup times and download costs. The streaming dataset object includes one or more features that optimize or improve training for machine-learned models. In one embodiment, the streaming dataset object is configured to allow different training machines to download disjoint subsets of the dataset. This means that regardless of the number of machines used for training, the data can be downloaded once, rather than having redundant copies of the data downloaded at each node. In one embodiment, the streaming dataset object is configured to allow downloads of samples asynchronously. The training begins as soon as a batch of samples are downloaded and proceeds to each successive batch as soon as the samples for those batch are downloaded. This reduces startup time as much as logically possible without altering the training.

To drive down egress and storage costs further, the streaming dataset object supports current state of the art compression algorithms. Furthermore, in one instance, the data is converted to a MDS (Mosaic Data Shard) format which is a performant file format for fast sample random-access, and stores data in serialized tabular form that reduces extraneous work, resulting in higher throughput for workloads that are bottlenecked by the data loader class. In this way, the training job finishes in less time.

In yet another embodiment, the streaming dataset object is configured to apply deterministic sample ordering, such that machines can resume training right where the machines left off, without having to pause and replay the whole set of samples that have been processed. Moreover, it does so without re-downloading data that has already contributed to training during single-epoch training. This fast resumption can save significant costs (e.g., thousands of dollars) in egress fees and idle GPU compute time compared to existing solutions.

The model serving system 170 deploys one or more machine-learning models. In one embodiment, the machine-learning models are neural networks, specifically transformer-based architectures with a significant number of parameters (e.g., equal to or above 1 million, 1 billion, 1 trillion parameters). In one instance, the machine-learning models are large language models (LLMs) that are trained on a large corpus of training data to generate outputs for tasks. In another instance, the machine-learning models are multi-modal transformer architectures including, text-to-image/video generation models, image/video-to-text generation models, and the like that are trained on a large corpus of paired training data.

A transformer model may be trained on massive amounts of text data, often involving billions of words or text units, images, videos, audio spectrograms, and the like. The large amount of training data from various data sources allows the LLM to generate outputs for many different types of tasks. A large-scale machine-learning model may have a significant number of parameters in a deep neural network (e.g., transformer model), for example, at least 1 billion, at least 15 billion, at least 135 billion, at least 175 billion, at least 500 billion, at least 1 trillion, or at least 1.5 trillion parameters. In another instance, the machine-learned models are large-scale image generation models that are trained on a large corpus of training data to generate images.

Since a large-scale machine-learning model has significant parameter size and the amount of computational power for inference or training the model is high, the machine-learning model may be trained and deployed or hosted on cloud infrastructure. A machine-learning model may be trained on a large amount of data from various data sources, including websites, articles, posts on the web, and the like. From this massive amount of data coupled with the computing power of model, the model is able to perform various tasks and synthesize responses based on information extracted from the training data.

In one embodiment, the model serving system 170 is managed or may be part of the data processing service 102, and is responsible for deploying a trained model to process inference requests from users. In another embodiment, the model serving system 170 may be managed by another entity, and there may be different instances of the model serving system 170 deploying a respective model deployed by a respective entity. In one embodiment, the machine-learning model of the model serving system 170 is trained on one or more nodes, each node including one or more devices such as GPU's or TPU's.

While a LLM with a transformer-based architecture is described as a primary embodiment, it is appreciated that in other embodiments, the language model can be configured as any other appropriate architecture including, but not limited to, long short-term memory (LSTM) networks, Markov networks, bi-directional encoder representation transformer (BERT), generative-adversarial networks (GAN), or diffusion models (e.g., Diffusion-LM).

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102.

For example, when the data storage system 110 is managed by the entity managing the data processing service 102, the data storage system 110A may reside within the data layer 108. The data storage system 110A may include dedicated cloud storage for respective tenants of the data processing service 102. In another instance, the data storage system 110B may be external and/or remote to the data processing service 102 in that a different entity manages the data of the data storage system 110B. For example, the data storage system 110B may be located in a remote location from the data processing service 102.

The client devices 116 are computing devices that display information to users and communicate user actions to the systems of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the various systems of the system environment 100 through an application programming interface (API) running on a native operating system of the client device 116, such as IOS® or ANDROID™. In the system environment 100, only one client device 116 are shown for the sake of simplicity. However, it is appreciated that the system environment 100 may include many more client devices 116 connected to the network 120.

Figure 2:
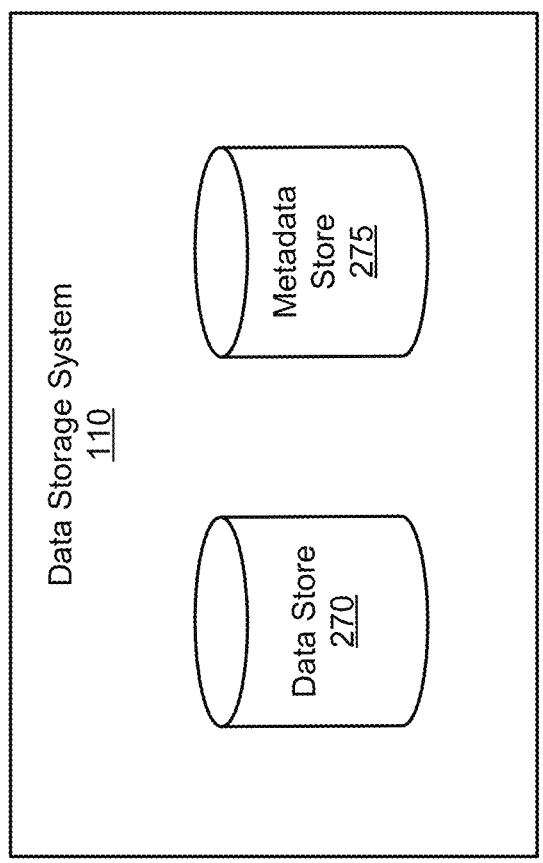
FIG. 2 illustrates a block diagram of an architecture of a data storage system, in accordance with an embodiment.

FIG. 2 is a block diagram of an architecture of a data storage system 110, in accordance with an embodiment. The data storage system 110 includes a data store 270 and a metadata store 275. In one embodiment, the data storage system 110 includes a data ingestion module 250 (not pictured).

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110A.

In one embodiment, a new version of the data table is committed when changes of a respective transaction are successfully applied to the data table of the data storage system 110A. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

In some embodiments, the data storage system 110 stores data used for machine learning applications implemented by the control layer. The data storage system 110 may include a machine learning (ML) model server (not pictured) which stores ML models, versions of each of the ML models, and sets of parameters for the trained ML models. The ML model server may also store training data and testing data for training and testing the ML models. The ML model server may also store inputs and generated outputs of the ML models. In an embodiment, the ML models are developed by users of the data processing service 102, and training and testing data are provided (e.g., uploaded) by the users.

Figure 3:
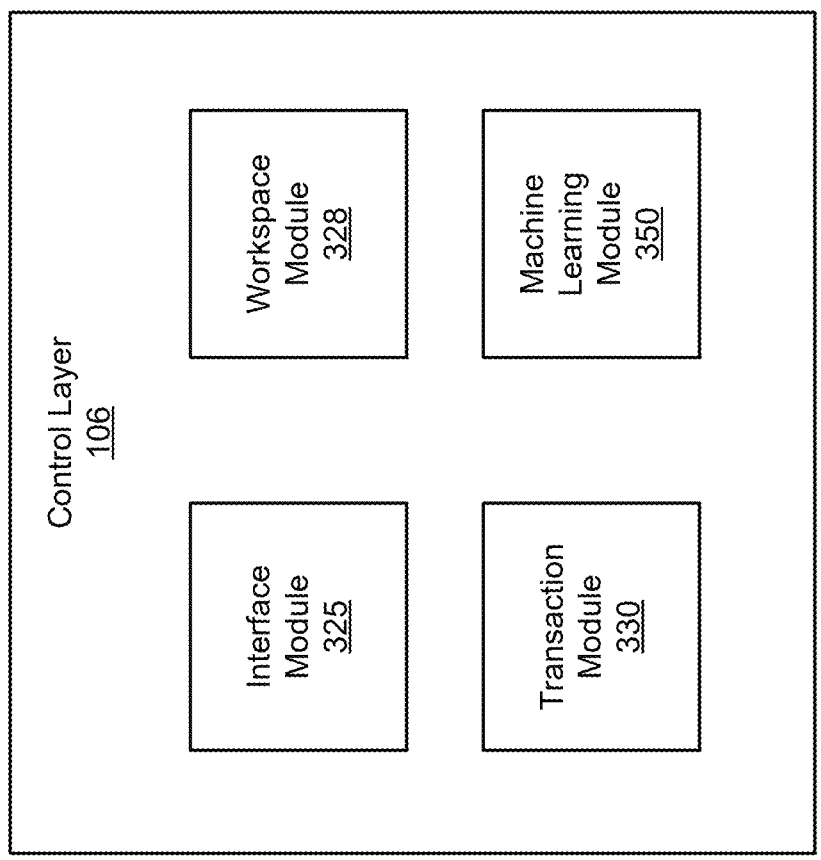
FIG. 3 illustrates a block diagram of an architecture of a control layer, in accordance with an embodiment.

FIG. 3 is a block diagram of an architecture of a control layer 106, in accordance with an embodiment. In one embodiment, the data processing service 102 includes an interface module 325, a workspace module 328, a transaction module 330, and a machine learning module 350. In some embodiments, the control layer 106 also includes a data notebook store 360 (not shown in the drawing).

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module 328.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The machine learning module 350 receives requests from one or more users of client devices 116 and performs tasks such as training or deploying a machine-learned model. In one embodiment, as described in conjunction with FIG. 1, the machine learning module 350 is responsible for coordinating training of machine-learned models by configuring streaming dataset objects and data loader class instances in conjunction with computing nodes on one or more cluster computing systems 402, as described in more detail in conjunction with FIGS. 5 through 10.

Figure 4:
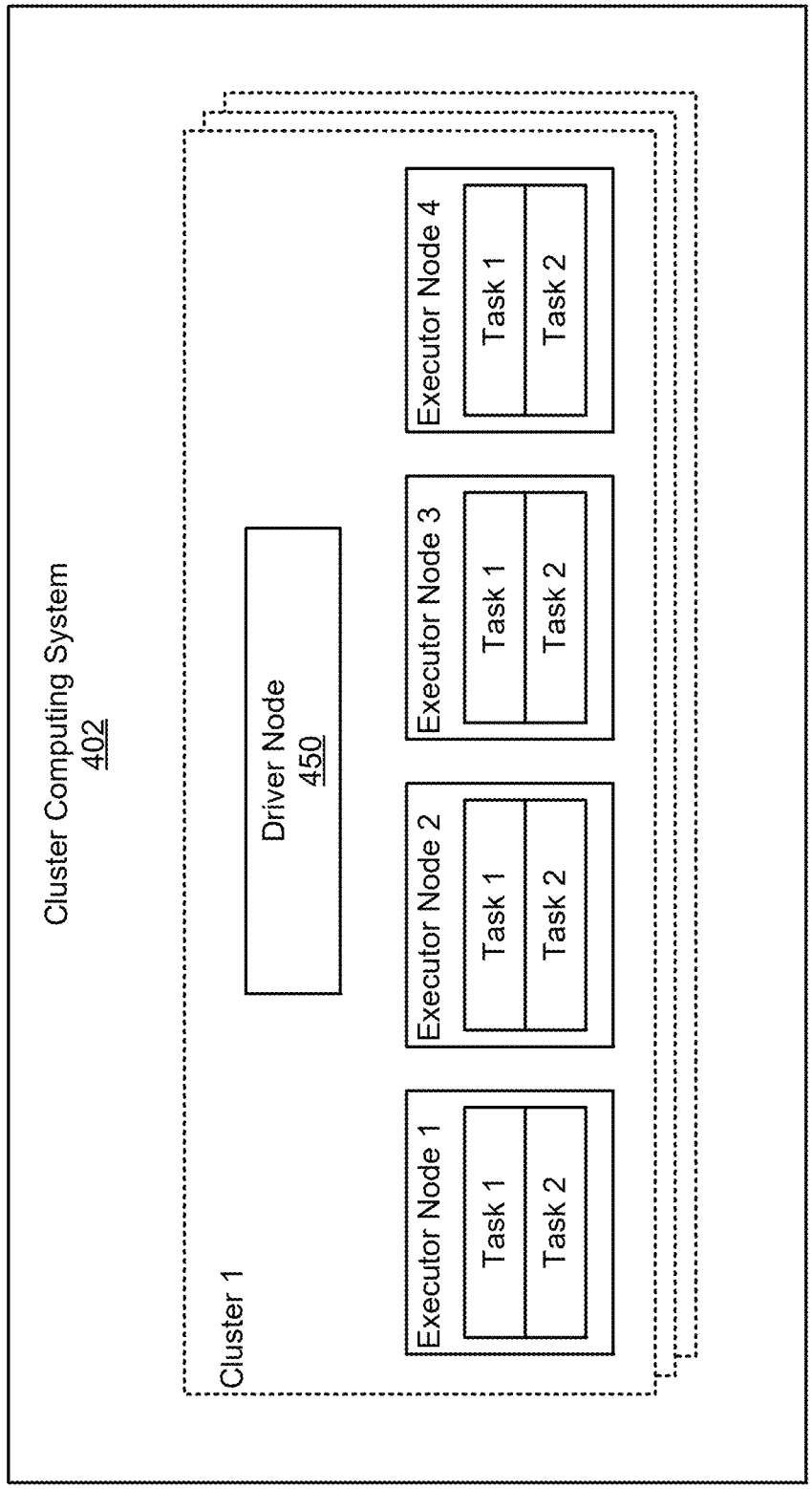
FIG. 4 illustrates a block diagram of a cloud computing system of a data layer, in accordance with an embodiment.

FIG. 4 is a block diagram of a cloud computing system 402 of the data layer 108, in accordance with an embodiment. The cloud computing system 402 of the data layer 108 (or in some embodiments, the control layer 106) includes a driver node 450 and worker pool including multiple executor nodes. The nodes may be structured for execution by a computer system, e.g., 1000 having some or all of the components as described in FIG. 10, such that the computer system 1000 operates in a specified manner as per the described functionality.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the generated code for the database query for a particular subset of data that is processed by the database query. The executor nodes execute the query based on the received information from the driver node 450.

Figure 5:
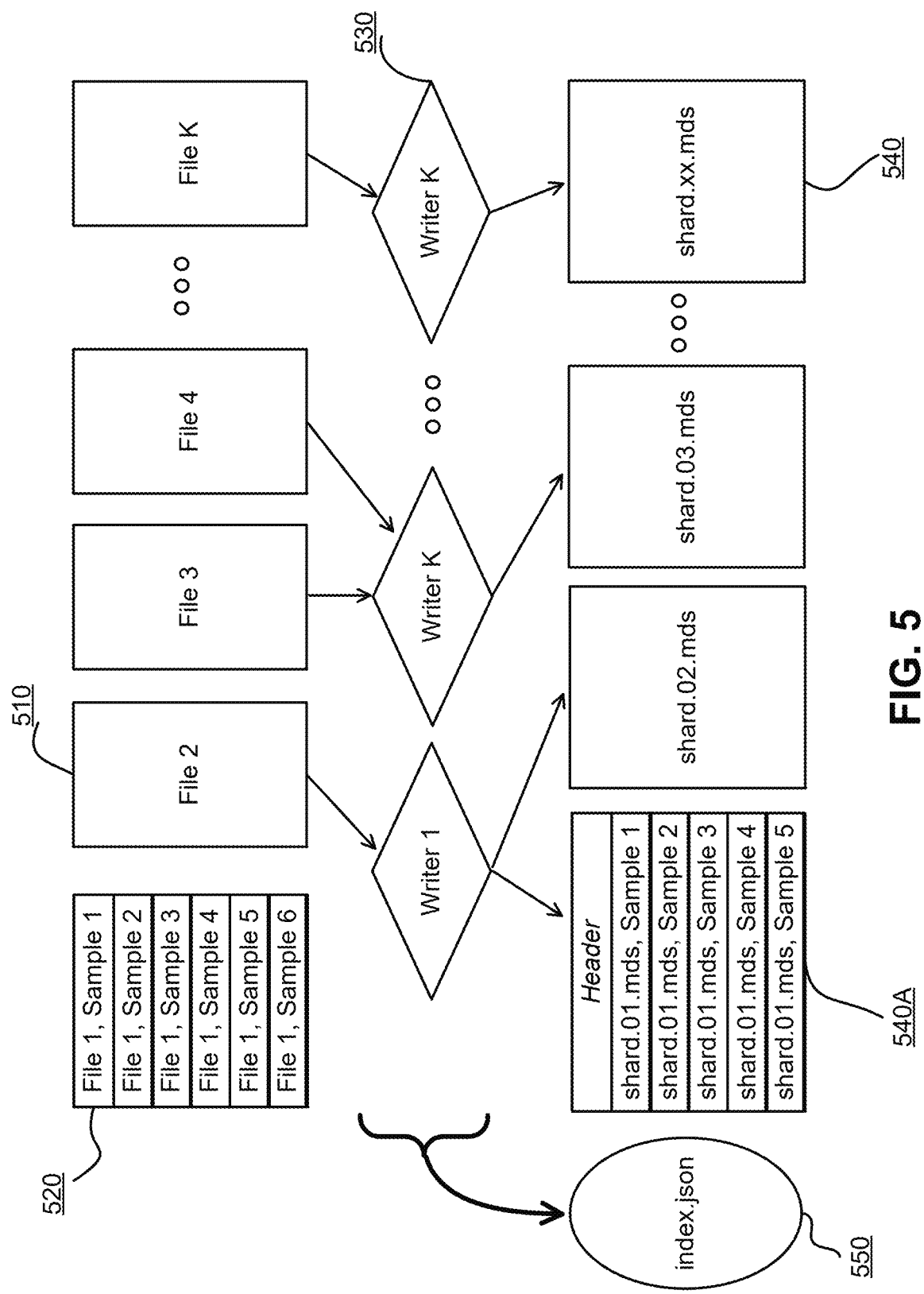
FIG. 5 illustrates an example process of writing a dataset into multiple shard files of binary format, in accordance with an embodiment.

Overall Architecture for Streaming Dataset and Sample Downloads Using Disjoint Shard Files FIG. 5 illustrates an example process of writing a dataset into multiple shard files of binary format, in accordance with an embodiment. In some embodiments, the machine learning module 350 in the data processing service 102 may access one or more data files from one or more data streams. A data stream as defined herein is a source of data that can be used for training a machine-learning model and is, for example, composed of multiple files, multiple messages, and the like. A user may designate one or more data streams for training a machine-learning model. In one embodiment, the one or more data streams include data from two or more datasets that may each be stored at a different storage location. As an example, a first dataset may be stored at a cloud storage location and a second dataset may be stored at an attached storage. The first dataset may be converted into a first stream with one or more shard files, and the second dataset may be converted into a second stream with one or more shard files.

In some embodiments, each data file 510 may include a plurality of samples 520. The samples 520 may be processed over one or more iterations of training a machine-learning model. In some implementations, each sample 520 may include a sample ID that identifies the corresponding sample. In one instance, the input data may be a raw dataset that includes original dataset files 510 that contain human-readable samples 520. In some embodiments, the data files 510 may include image, text, video, and multimodal data. In some embodiments, the data file 510 may be in a format of shard file, MDS, CSV, TSV, JSONL, etc. A sample ID may refer to a particular row in the data table, or any particular instance of data in the dataset.

As shown in FIG. 5, the machine learning module 350 may deploy one or more writers 530 to convert the one or more data files 510 to one or more discrete shard files 540. Each shard file 540 may include a respective subset of samples from the plurality of samples 520. A writer 530 may be a native file writer. In one implementation, the writer 530 may write data samples by sample. For instance, the writer 530 may write the data into a shard file (e.g., shard.00000.mds) and once the shard file reaches a size limit, the writer 530 may create a new shard file with a number incremented (e.g., shard.00001.mds). A shard file 540 may include a size limit in bytes. The shard file size depends on the dataset size. Too small of a shard size creates a large number of shard files and heavy network overheads, and too large of a shard size creates fewer shard files, but the model training start time would increase since a computing resource needs to wait for a shard file to get downloaded locally to start a training process. In some implementations, the shard file size may be, e.g., 64 Mb, or 128 Mb.

A shard file 540 may be a row-oriented file that reads a sample by reading its start/stop bytes from the header and then seeks to sample. A sample in a shard file 540 may be a singular data entity or a dictionary of key-value pairs where the key is a data field, and the value is data. In some embodiments, the shard file 540 may include the sample data that is encoded into bytes, for example, conceptualized as a table. In one instance, the shard files 540 include samples that have been serialized to binary format. In another instance, columns of a shard file 540 may have data types, which deserialize into a Python object such as int, str, PIL Image, etc. The shard files can be uploaded to cloud storage. In one instance, each shard has a header that allows for fast random access to every sample during model training.

In some embodiments, the writer 530 may create a metadata file 550 for a data stream, such as index.json file 550 along with the generated shard files 540. The index.json files may be used to describe relevant information about the stream, such as the number of shard files 540, number of samples per shard file, the shard sizes, the fields of each sample, and the like. In some embodiments, each shard file 540 may include a shard index that identifies a specific shard file 540. The streaming dataset object 550 may assign sample ID's based on the number of samples included in each shard file as identified in the JSON file. The streaming dataset object may generate a mapping between the shard indices and the sample ID of each sample included in the respective shard file 540. Based on the mapping, a streaming dataset object may later identify the respective shard file 540 in which a sample is located based on the sample ID. In one instance, the streaming dataset object may keep a shards-to-samples list, which includes sample IDs of given shard files into a single array, e.g., Shard 1 (0001, 0002, 0003, . . . ). For example, a worker is assigned to process Sample 0001, and based on the mapping, the streaming dataset object may identify that Sample 0001 is included in Shard 1 and instruct the worker to download Shard 1 to access Sample 0001. In some embodiments, the sample ID may be associated with a sequential order indicating a number of samples included in a shard.

During one or more iterations of training the machine-learning model, to perform the training on the assigned samples, a worker identifies the shard files 540 that include the assigned sample ID's, and downloads the identified shard files 540 to access the assigned samples 520. Since the samples are stored in the discrete shard files 540, the workers access the samples by downloading the samples shard by shard. For example, in FIG. 5, a shard file 540A includes 5 samples. If a worker is assigned to process Sample 3, the worker will download the whole shard file 540A, including downloading all 5 samples in the shard file 540A. In some embodiments, workers of the same node may share the shard file, e.g., having access to the samples in the same shard file. For instance, Worker 1 of Node 1 may download the shard file 540A and performs the training using Sample 3. Workers of the same node, e.g., Worker 2 of Node 1 may have the access to the samples in the same shard file 540, e.g., performing the training using Sample 1 in the shard file 540A.

Figure 6:
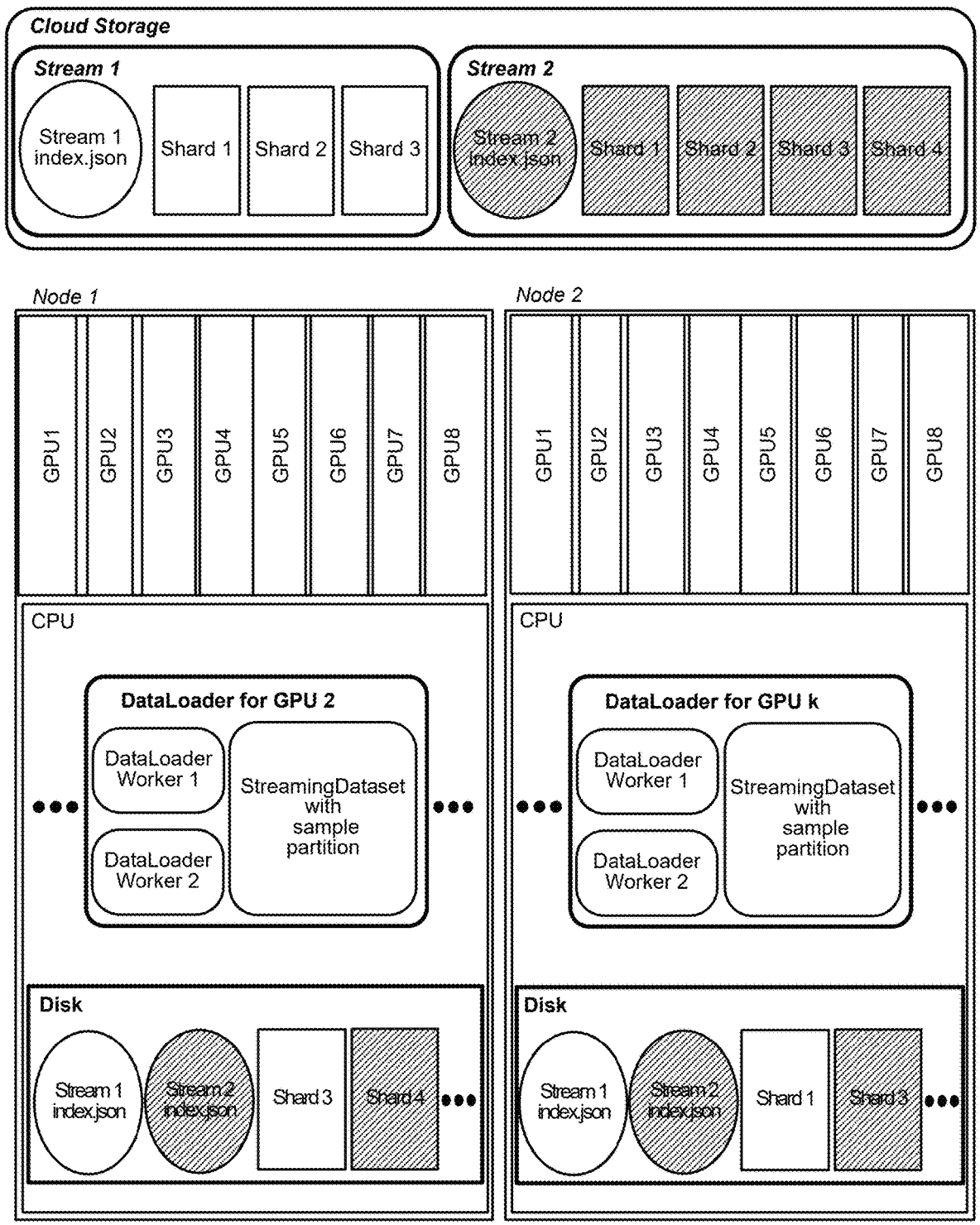
FIG. 6 is an architecture of downloading samples from shard files for training a machine-learning model, in accordance with an embodiment.

FIG. 6 is an architecture of downloading samples from shard files for training a machine-learning model, in accordance with an embodiment. As shown in the architecture of FIG. 6, there are two data streams, Stream 1 and Stream 2 stored in cloud storage. In some instances, Stream 1 and Stream 2 may be stored in external sources that are at different locations from one another. Stream 1 is written into three shard files, and Stream 2 is written into four shard files. In addition, there are two nodes in the architecture, Node 1 and Node 2. Each node is coupled to eight GPU's. Each node also has a CPU and disk memory. In one embodiment, each device (e.g., GPU) in a node is associated with a respective data loader class. The data loader for the device has one or more data loader workers for constructing a batch of training samples and wraps the streaming dataset object. In the architecture shown in FIG. 6, each device is associated with two data loader workers. For example, FIG. 6 illustrates an architecture for GPU 2 of Node 1, having a DataLoader instance with two DataLoader workers, and samples assigned to each worker based on the streaming dataset object.

In one embodiment, the training process of a machine-learning model includes one or more iterations for an epoch through a training dataset. At each iteration, a "global batch" of samples for that iteration is constructed by the data loader workers. In one instance, as described in further detail below, a worker is responsible for constructing a batch of sample ID's based on the streaming dataset object. At each iteration, one worker from each device constructs the batch of samples assigned to the worker and provides the batch of samples to the device. The collection of batches across devices constitutes the global batch for that iteration. A forward pass step is performed for the iteration where the current state of the model parameters (e.g., loaded onto each device for that iteration) is applied to the batch of samples. A loss function is applied, and parameters of the model are updated based on the loss value. This process is repeated for the next iteration, and so on, until the entire epoch is used to train the parameters of the model.

In some embodiments, as described in detail below, the streaming dataset object partitions and shuffles the samples, such that workers of different nodes (regardless of whether nodes are shut down or instantiated in the middle of training) may not access/download at least one or more of the same shard files, i.e., shard files downloaded by a first node are disjoint from the shard files downloaded by a second node.

In this way, two different nodes do not process samples in the same shard file. A shard file does not get downloaded twice by two different nodes which saves network bandwidth and egress costs. In some embodiments, the streaming dataset object may partition the sample space in a way so that no shard file is assigned to two different nodes. Different nodes may download and process the samples in the shard files independently.

As shown in the example architecture of FIG. 6, the samples of the training dataset are constructed based on samples in Stream 1 and Stream 2. The sample ID's are partitioned across the nodes, the devices per each node, and the workers for each device, such that the workers of one node download a disjoint set of shards from the workers of another node. That is, the batches constructed by workers of Node 1 contain samples that are included in a first set of shards and the batches constructed by workers of Node 2 contain samples that are included in a second set of shards discrete from the first set of shards. In the example illustrated in FIG. 6, the workers of Node 1 download Shard 3 of Stream 1, Shard 4 of Stream 2 up to a mid-point in the training process, while the workers of Node 2 download Shard 1 of Stream 1, Shard 3 of Stream 2 to the disk.

Sample Space Partitioning, Deterministic Sample Ordering, and Elastic Resumption Once the shard files are written, the streaming dataset object partitions the sample index space into a number of nodes, a number of devices per node, a number of workers per device, a number of batches assigned per worker, and samples per device batch. The streaming dataset object shuffles sample ID's of the training dataset and assigns batches of samples to each worker. In one embodiment, the process of shuffling the sample ID's and assigning batches to workers is performed to preserve deterministic sample ordering. In deterministic sample ordering, the ordering of the batches and the ordering of samples within each global batch that are processed by the machine-learning model at each iteration are preserved, regardless of whether there is a change in the number of physical nodes during training. In one embodiment, deterministic sample ordering is made possible by further defining one or more logical nodes (canonical nodes, or virtual nodes) that each correspond to a respective bucket of shard files and determines ordering of batches.

a. Sample Space Partitioning (5-D Partition Tensors)

The streaming dataset object partitions all dataset samples among number of nodes, GPU devices per node, CPU workers per GPU, batches per CPU worker, and samples per batch. In some embodiments, "nodes," "devices," "workers," "batches," and "batch size" are referred to as five dimensions for partitioning a sample space (e.g., the total dataset), and one five-dimensional (5D) tensor may be determined to describe the partition. Thus, the specific samples in each batch and the ordering of each batch a worker process will load is determined for the entire epoch. Importantly, this partitioning process reduces duplicate shard assignments between different nodes, such that the number of shard downloads per node needed during training is reduced, making the training process significantly more performant. As an example, there may be 2 physical nodes, 2 CPU workers per GPU device, but these values may vary depending on the training configuration.

In some embodiments, the streaming dataset object further divides the sample space into a number of "logical nodes." A logical node is a virtual node that each corresponds to a respective bucket of shard files. In some embodiments, in order to have deterministic ordering with a different number of physical nodes, the shuffle ordering is done over the logical nodes which are then assigned to physical nodes. A physical node may be associated with one or more logical nodes. Each logical node is assigned to only one physical node. The training process begins with the start of sample indices assigned to each logical node.

Figure 7A:
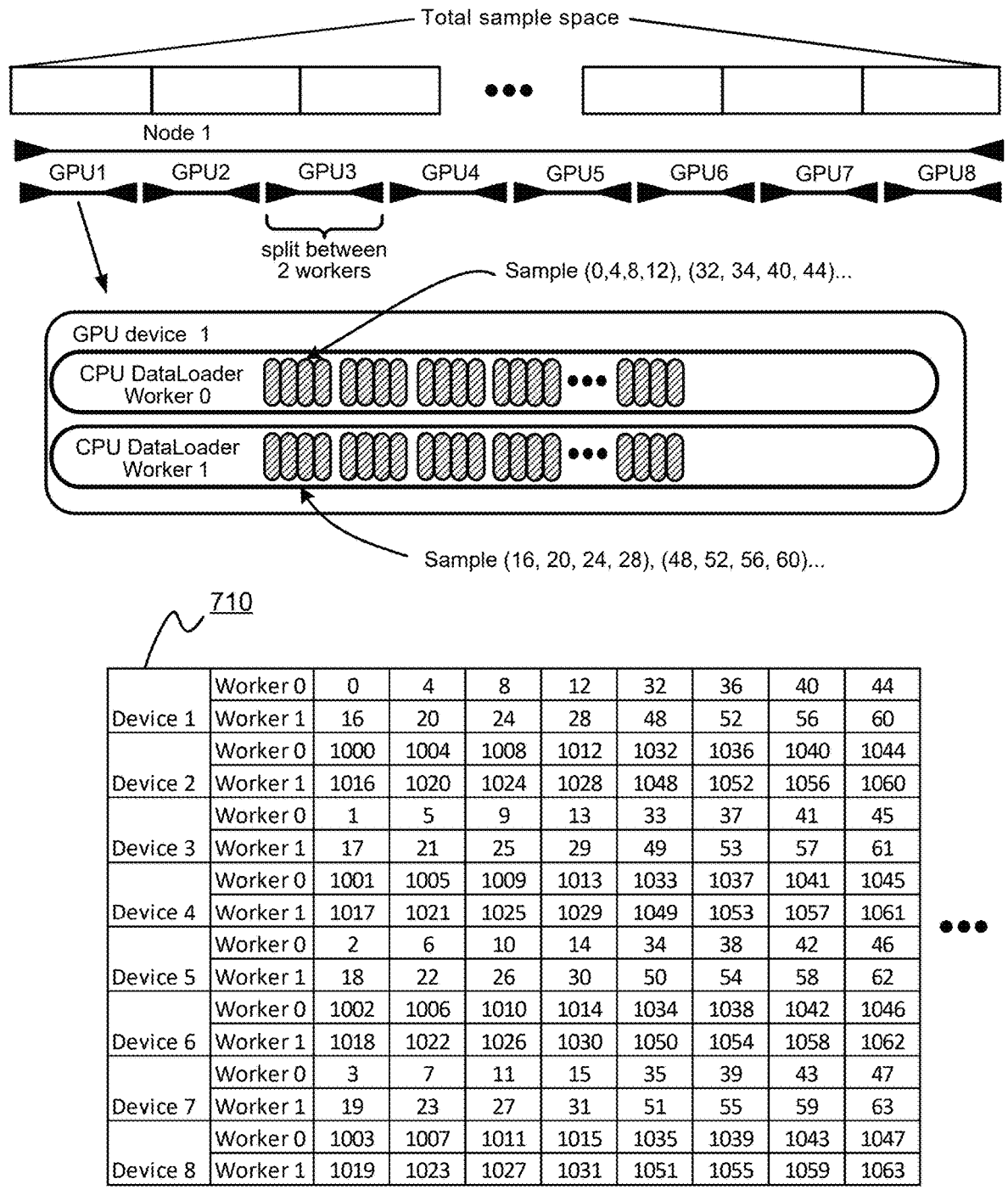
FIG. 7A illustrates a partition of a sample space with one node, in accordance with an embodiment.

FIG. 7A illustrates a partition of a sample space with one node, in accordance with an embodiment. As shown in FIG. 7A, there is one node with eight GPU devices. In one embodiment, the sample space may include 2000 samples, e.g., sample indices ranging from 0-999 and 1000-1999. For example, the sample space may include the combination of all samples from Stream 1 and samples from Stream 2. The streaming dataset object may generate a partition partitioning the sample space with a 5D tensor. Table 710 in FIG. 7A illustrates a portion of the sample assignment based on the 5D tensor. The 2000 samples are assigned to 1 node with 8 GPU devices.

Moreover, there are two logical nodes that partition Samples 1-999 to the first logical node LN1, and Samples 1000-1999 to the second logical node LN2. Devices 0, 2, 4, and 6 are assigned with Samples 0-999 (for LN1) and Devices 1, 3, 5, and 7 are assigned with Samples 1000-1999 (for LN2). Each GPU includes two CPU workers, and the batch size of each CPU worker is 4 (i.e., 4 samples per batch). The global batch size for a given iteration is 4×8, i.e., 32 samples per global batch. As shown in Table 710, at the first iteration, the batch assigned to Worker 0 in GPU Device 1 includes samples with indices (0, 4, 8, 12), the batch assigned to Worker 0 in GPU Device 3 includes samples with indices (1, 5, 9, 13), and so on. Similarly, the batch assigned to Worker 0 in GPU Device 2 includes samples with indices (1000, 1004, 1008, 1012), the batch assigned to Worker 0 in GPU Device 4 includes samples with indices (1001, 1005, 1009, 1013), and so on.

In the next second iteration, the batch assigned to Worker 1 in GPU Device 1 includes samples with indices (16, 20, 24, 28), the batch assigned to Worker 1 in GPU Device 3 includes samples with indices (17, 21, 25, 29), and so on. Similarly, the batch assigned to Worker 1 in GPU Device 2 includes samples with indices (1016, 1020, 1024, 1028), the batch assigned to Worker 1 in GPU Device 4 includes samples with indices (1017, 1021, 1025, 1029), and so on. In some embodiments, the samples in the sample space may be shuffled, and the sample indices of the partition are later mapped to the sample IDs after shuffling.

Figure 7B:
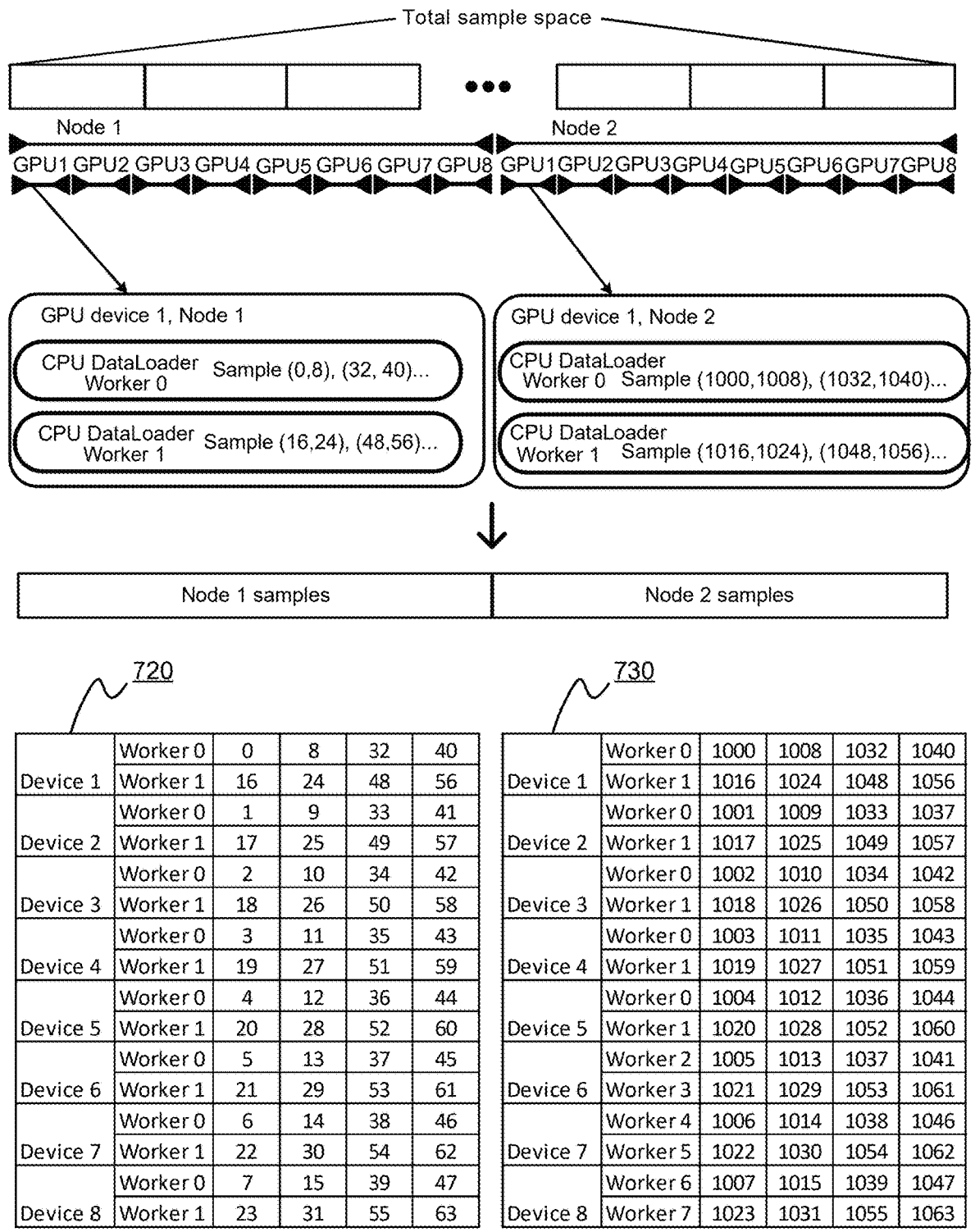
FIG. 7B illustrates a partition of a sample space with two nodes, in accordance with an embodiment.

FIG. 7B illustrates a partition of a sample space with two nodes, in accordance with an embodiment. As shown in FIG. 7B, there are two nodes, each having eight GPU devices, i.e., 16 GPU devices in total. There are still two logical nodes that partition Samples 1-999 to the first logical node LN1, and Samples 1000-1999 to the second logical node LN2. The partition assigns sample indices 0-999 to workers in Node 1 (for LN1) and sample indices 1000-1999 to workers in Node 2 (for LN2). Table 720 and Table 730 each illustrates a portion of the sample assignment for Node 1 and Node 2, respectively. Compared with FIG. 7A, the global batch does not change, i.e., 32 samples per global batch. Since in FIG. 7B, the number of nodes (and GPU devices, workers) is doubled, the number of samples per batch is halved. Hence, at each iteration, each GPU device is assigned with two samples.

As shown in Table 720 and Table 730 of FIG. 7B, at iteration 1, Worker 0 of GPU Device 1 of Node 1 is assigned to sample ID's corresponding to sample indices (0, 8), Worker 0 of GPU Device 2 of Node 1 is assigned to sample ID's corresponding to indices (1, 9), and so on. Worker 0 of GPU Device 1 of Node 2 is assigned to sample ID's corresponding to sample indices (1000, 1008), Worker 0 of GPU Device 2 of Node 2 is assigned to sample ID's corresponding to indices (1001, 1009), and so on. At iteration 2, Worker 1 of GPU Device 1 of Node 1 is assigned to sample ID's corresponding to sample indices (16, 24), Worker 1 of GPU Device 2 of Node 1 is assigned to sample ID's corresponding to indices (17, 25), and so on. Worker 1 of GPU Device 1 of Node 2 is assigned to sample ID's corresponding to sample indices (1016, 1024), and Worker 1 of GPU Device 2 of Node 2 is assigned to sample ID's corresponding to indices (1017, 1025), and so on.

As illustrated in more detail below in conjunction with the subsection on "Elastic Resumption," dividing the sample space across logical nodes allows the machine learning module 350 to preserve deterministic sample ordering when, for example, a number of nodes has changed during the training process. The logical nodes allow the ordering of batches to be preserved even if the number of nodes has been changed.

Sample Space Shuffling

FIGS. 8A-8E illustrate example shuffling processes to shuffle samples in one or more datasets, in accordance with an embodiment. In some embodiments, the streaming dataset object may shuffle the samples of the streaming dataset. In one implementation, the samples are shuffled when mixing the samples from different data streams. In one implementation, the samples are shuffled within each node using a partial shuffling process. In one instance, the samples may be shuffled only within each logical node to preserve the partitioning of shard files between different nodes, which maintains the reduced shard download demand during training. In one embodiment, the streaming dataset object shuffles the samples by shuffling the sample indices, and the output of the shuffling process is a shuffled array of sample indices. The streaming dataset object maps the shuffled sample indices with the corresponding sample IDs in the 5D partition tensor to assign the specific ordering of batches, and the specific ordering of samples within each batch to a data loader worker.

For example, if there are 10 samples, and the current partition is [[0, 2, 4, 6, 8], [1, 3, 5, 7, 9]] across two workers. There may be a mapping from index 0 to sample S0, index 1 to sample S1, and so on. The array of sample indices is [0, 1, 2, 3, 4, 5, 6, 7, 8, 9] and the indices are shuffled to get [3, 4, 1, 2, 0, 8, 6, 9, 7, 5]. The shuffled array is a mapping between which sample IDs to replace the assigned indices with. For example, index 0 is mapped to shuffled index 3, and therefore mapped to S3. As another example, index 2 is mapped to shuffled index 1, and therefore mapped to S1. The final shuffled partition may be [[3, 1, 0, 6, 7], [4, 2, 8, 9, 5]].

Figure 8A:
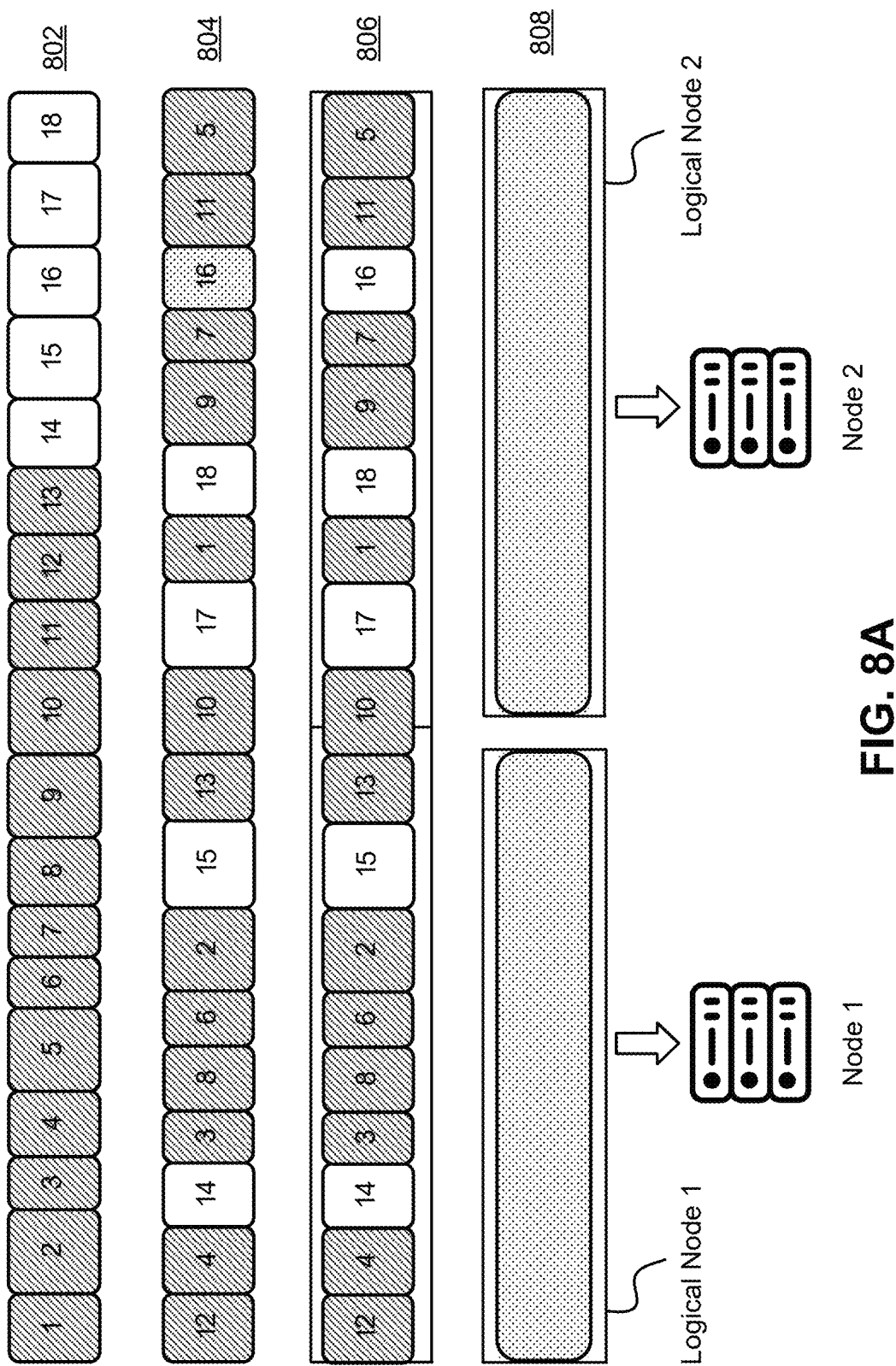
FIG. 8A illustrates an overview of a shuffling process for one or more datasets, in accordance with an embodiment.

FIG. 8A illustrates an overview of a shuffling process for one or more datasets, in accordance with an embodiment. In one embodiment, the ordering of the shard files from all datasets are shuffled. The shard files are split over a number of "logical nodes." As shown in FIG. 8A, at step 802, the streaming dataset object writes the datasets from Stream 1 (shown as shaded in FIG. 8A) and datasets from Stream 2 into shard files as described in detail in conjunction with Section 1 above. The shard files have shard indices that identifies the respective shard file, e.g., Shard, 1, Shard 2, etc. At step 804, the streaming dataset object may shuffle all the shard files so that the datasets from different streams are mixed randomly. The shuffling process may generate a shuffled shard index array (including a shuffled sample ID array). In some implementations, the streaming dataset object may keep a seed value for recording the shuffling order. By using the seed value, the streaming dataset object may repeat the shuffling and re-produce the same shuffled shard index array.

At step 806, the streaming dataset object may split the shard files over logical nodes. For example, in FIG. 8A, the shuffled shard files are equally distributed over two logical nodes. In some embodiments, the streaming dataset object may further shuffle the samples within each logical node. As shown in FIG. 8A, at step 808, the streaming dataset object shuffled each logical node's samples with a partial shuffling algorithm. The output of this shuffling process may be a shuffled sample ID array that maps the sample indices to the corresponding sample IDs. The logical nodes are assigned to physical nodes. Based on the 5D tensor, a worker in a physical node may map the sample indices assigned to the worker to corresponding batches of sample IDs based on the shuffled sample ID array. The worker then downloads the assigned samples with the sample ID's and performs the training of a machine-learning model.

Figure 8B:
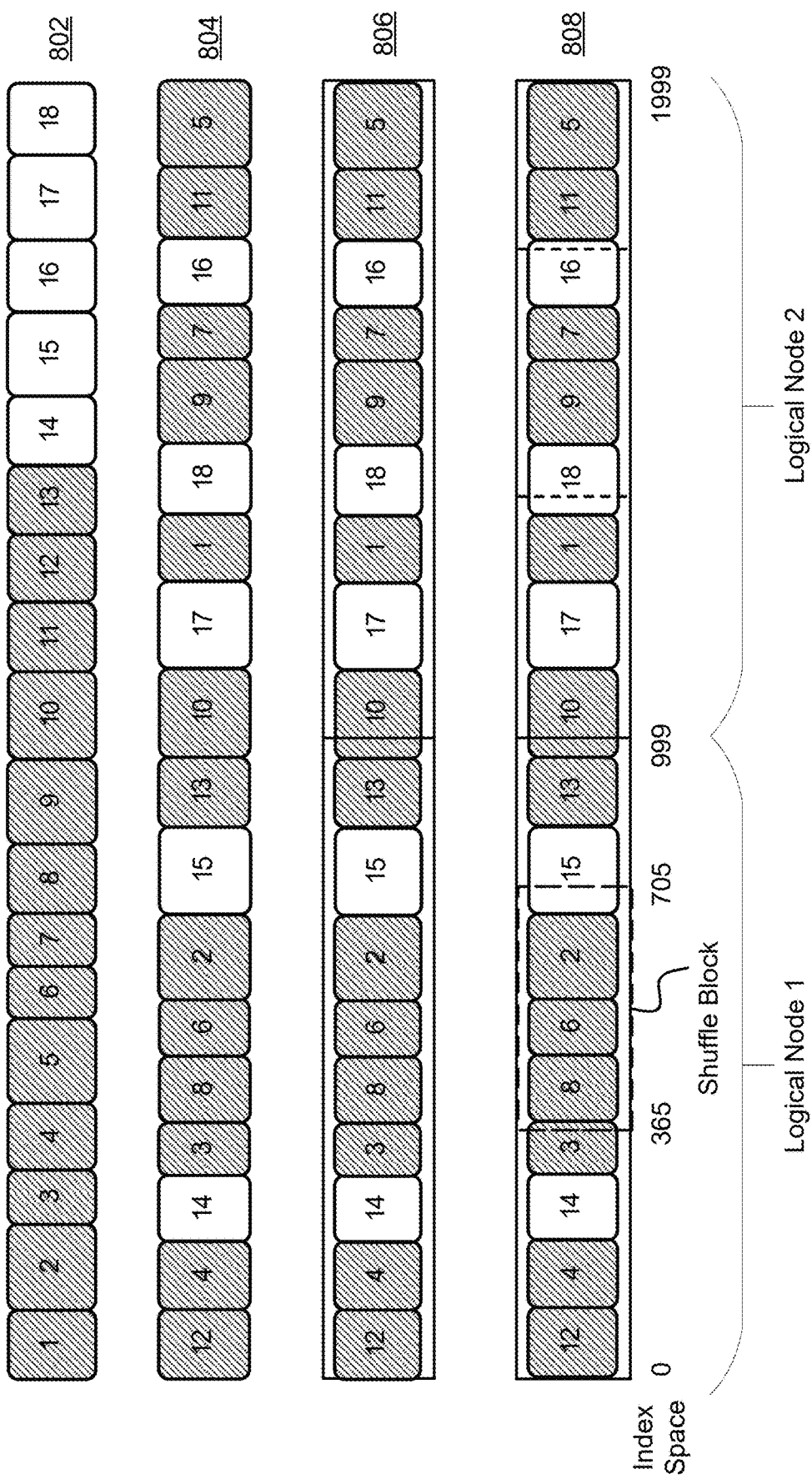
FIG. 8B illustrates an example shuffling process, in accordance with an embodiment.

FIG. 8B illustrates an example shuffling process, in accordance with an embodiment. Similar to the shuffling process in FIG. 8A, from steps 802-806, the streaming dataset object may write shard files from all streams, globally shuffle the shard files and divide that sample space over logical nodes. In one embodiment, at step 808, the streaming dataset object may shuffle the samples in fixed-size blocks, e.g., shuffle blocks, within each logical node. A shuffle block may include a span of sample ID's of at least one shard file. In some implementation, the shuffle block size may be larger than a single shard file, and a shuffle block include one or more shard files. In this way, the content of the shard files may be spaced out and shuffled in the shuffle block to improve any previous shuffling. The number of shard files required to be downloaded by a node to begin training is limited to the number of shard files within a shuffle block. For example, the ordering of the sample ID's within the referenced "Shuffle Block" in FIG. 8B may be (S0399, S0800, . . . , S0899, S0600, . . . , S0699, S1500, . . . , S1510), which are sample ID's included in the last portion of shard 3, shards 6 and 8, and the starting portion of shard 15. After shuffling, the span of the sample index space 365-705 may correspond to a shuffled set of sample ID's (S0699, S1506, . . . , S0899). A similar process can be performed for other shuffle blocks.

Figure 8C:
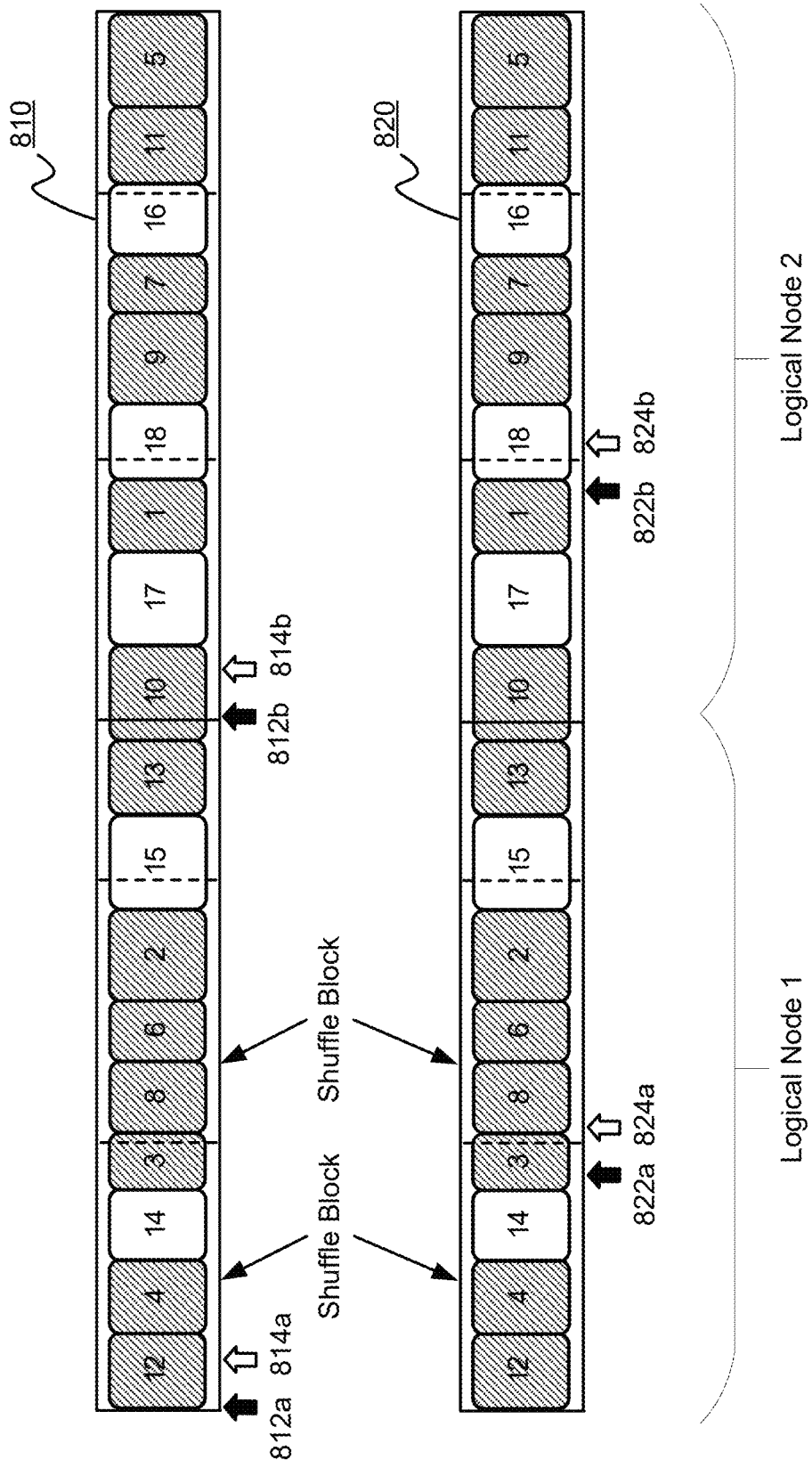
FIG. 8C illustrates shard file downloading for an example shuffling process, in accordance with an embodiment.

FIG. 8C illustrates a process of shard file downloading based on the example shuffling process of FIG. 8B, in accordance with an embodiment. In the example of FIG. 8C, there are 2 logical nodes and 1 physical node (i.e., 2 logical nodes assigned to 1 physical node), and the example illustrates the number of live shard files that may be stored in the memory of the physical node at a certain iteration, e.g., 810, 820. At the iteration 810, the current batches to be processed are indicated by black arrows 812a and 812b, one for each logical node). The pre-download batches, i.e., batches pre-fetched to be used in the next iteration are indicated by white arrows 814a and 814b.

In some embodiments, to improve shuffle quality and efficiency, the shuffling algorithm requires more shard files to be downloaded and stay resident. As shown in FIG. 8C, at the beginning of training (indicated by black arrows), because the samples in each block are completely shuffled, a worker may need to download all the shard files in the shuffle block in order to access the assigned samples. For example, a worker is assigned with 4 samples. In FIG. 8C, the 4 samples may be distributed in the 4 shard files in the first shuffle block (e.g., Shard 12, Shard 4, Shard 14, and Shard 3). Hence, the worker will download the 4 shard files in the first shuffle block, and any new shard file in the pre-download range (814*a*, 814*b*, indicated by white arrows).

Thus, at the beginning of each shuffle block, the number of live shard files to be downloaded per physical node=(LN/PN)×(SBS/shard size). Here, LN stands for the number of logical nodes, PN stands for the number of physical nodes, SBS stands for the shuffle block size, i.e., number of samples per shuffle block. When the pre-download range enters the second shuffle block, shown as the iteration 820, the workers will retain the 4 shard files from the first shuffle block (e.g., 822*a* and 822*b*) to progress with training, but will also need to download the 4 shard files of the subsequent shuffle block (e.g., 824*a* and 824*b*). In this situation, the number of live shard files to be downloaded=2×(LN/PN)×(SBS/shard size).

Figure 8D:
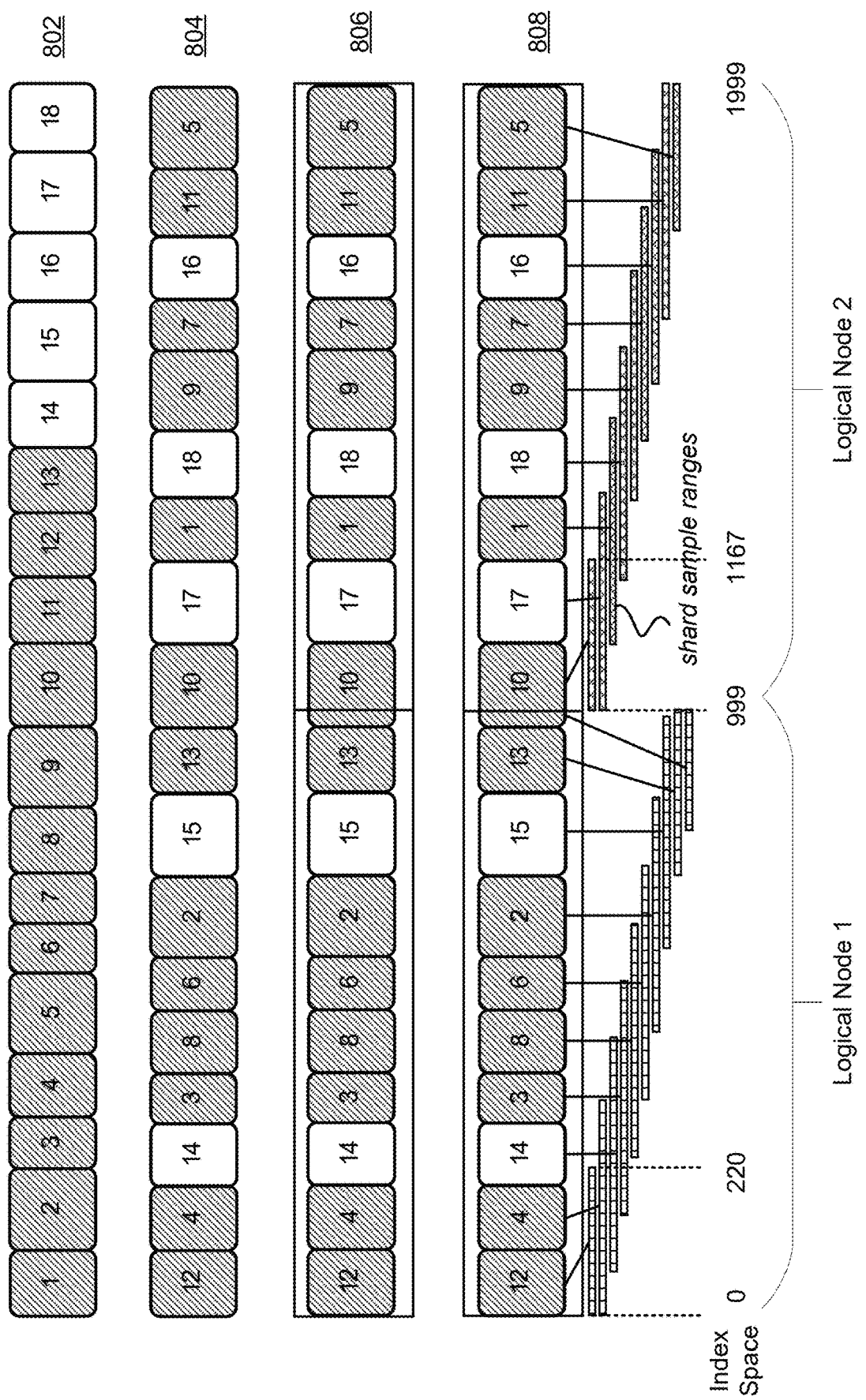
FIG. 8D illustrates an example shuffling process, in accordance with an embodiment.

FIG. 8D illustrates an example shuffling process, in accordance with an embodiment. In the example shown in FIG. 8D, the samples within each shard file are distributed over a maximum range of a shuffle block size. Compared to the example of FIG. 8B, the steps 802-806 are the same. At step 808, in FIG. 8D, the samples are randomly distributed from each shard over an expanded range. Thus, the shuffling process in FIG. 8D essentially extends the sample space of each shard. The shuffle quality may be similar but less live shard files (i.e., number of shard files active in a node) may be needed. For example, the ordering of the sample ID's within shard 12 may be (S1200, . . . , S1299). After shuffling, the sample ID's for shard 12 may extend to the span of sample indices 0 to 220. A similar process can be performed for other shards and shuffle blocks.

Figure 8E:
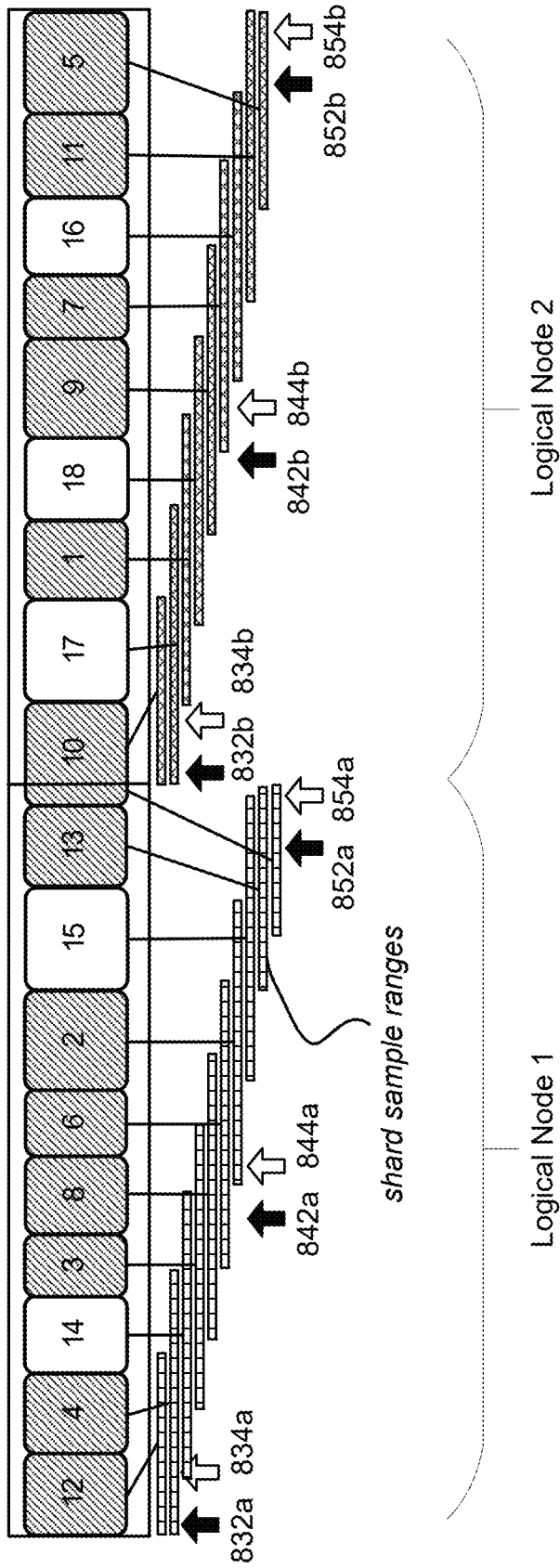
FIG. 8E illustrates shard file downloading for an example shuffling process, in accordance with an embodiment.

FIG. 8E illustrates shard downloading for the example shuffling process of FIG. 8D, in accordance with an embodiment. In the example of FIG. 8E, there are 2 logical nodes and 1 physical node, and the example illustrates the number of live shard files that may be stored in the memory of the node at a given iteration. During training, the workers only need the shard files whose sample ranges are present at that point (as indicated by black arrows), and any new shard files in the pre-download range (as indicated by white arrows). Because sample ranges are limited to logical node boundaries, the start and end of each logical needs half as many live shard files, i.e., the number of live shard files=0.5×(LN/PN)×(SBS/shard size). The middle of each logical node requires the same number of live shard files as the example shown in FIG. 8C, i.e., the number of live shard files=(LN/PN)×(SBS/shard size).

In one example, after the sample aggregation, the streaming dataset object may generate a sample ID array and partitions the samples among the workers. The streaming dataset object swaps the sample indices assigned by the 5D tensor with corresponding sample IDs in the shuffled sample ID array, so that each worker gets assigned the respective batches of samples. Returning to the example in FIG. 7A, the 5D partition tensor assigns Worker 1 of Device 1 in Node 1 with a batch of samples for the first iteration, with sample indices (0000, 0004, 0008, 00012). If performed without shuffling, the sample indices (0000, 0004, 0008, 00012) may be mapped with the sample IDs (S0000, S0004, S0008, S0012). Samples (S0000, S0004, S0008, S0012) may be included in a shard file with a Shard Index, e.g., Shard 001. During the shuffling process, the samples may be randomly shuffled at step 804, 808, e.g., shuffled within a node, a shard file, and/or a shuffle block. After the shuffling, the order of the samples in the sample ID array has changed. For example, after shuffling, the sample indices (0000, 0004, 0008, 00012) may be mapped with the sample IDs (S0407, S1293, S0420, S1205) which are stored in shard files Shard 12 and Shard 4, respectively. The Worker 1 of Device 1 in Node 1, at this iteration, will download Shard 12 and Shard 14 and perform the training process with sample IDs (S0407, S1293, S0420, S1205).

Elastic Resumption

The training process starts from the start of each logical node. When iterating during training, the sample space is divided evenly according to the number of logical nodes. These divisions are read concurrently from beginning to end striping over data loader workers in a precise pattern that preserves elastic determinism. In one example, if there are 2 physical nodes and 4 logical nodes, each global batch is split between 4 logical nodes. In this manner, logical nodes enable deterministic training on an increased number of devices. For instance, if a training process is stopped intermediately, and the user wants to increase the number of nodes from 2 physical nodes to 4 physical nodes, 1 logical node can be assigned to each respective physical node and the device batch size is halved such that the sample ordering upon resumption remains the same.

Therefore, as described above, the machine learning module 350 described herein ensures deterministic ordering and elastic resumption by ensuring that the ordering of batches as well as the ordering of samples within each batch remains consistent regardless of whether additional nodes are added or existing nodes are shut down during the training process. Specifically, when the training process is stopped midway and resumed with a different number of nodes, the deterministic ordering enforced using the streaming dataset object allows the cluster resources to quickly resume where the previous training iterations left off. For partitions during resumption, the constraints are that (i) the global batch size remains constant during training, (ii) the seed (for any randomization during the shuffling process) is kept the same, and (iii) the number of logical nodes is maintained.

In one embodiment, to enable elastic resumption, the data loader maintains a checkpoint indicating a total number of samples the machine-learning model processed during an epoch. For example, the checkpoint file may indicate that 300,000 samples were already processed out of a total of 1,000,000 samples. If a node fails or an additional node is added during training, the streaming dataset object repartitions the sample space with the updated number of physical nodes. The streaming dataset object performs the shuffling process using the same seed values to generate the shuffled sample ID array and assigns the batches of samples to each worker as described in detail above. Based on the checkpoint, the training process can quickly resume at the 300,000th sample.

Referring back to FIG. 7A, the training process may start with a single node as illustrated in FIG. 7A. After iteration 55, the cluster resources may fail, and the user may request to resume the training process with the number of physical nodes doubled. The checkpoint file may indicate that 55 iterations * 32 samples per global batch=1760 samples have been processed so far. In particular, data loader workers for Devices 1, 3, 5, 7 may have constructed batches of samples for sample ID's mapped to indices 0 through 879, and data loader workers for Devices 2, 4, 6, 8 may have constructed batches of samples for sample ID's mapped to indices 1000 through 1879.

After a new second node is added, the sample assignments (Table 720 and Table 730) are changed accordingly as shown in FIG. 7B. Since there are double the number of physical nodes, the batch size per device halves, but the number of batches processed by a worker may stay the same. In particular, while in FIG. 7A, both logical nodes are mapped to one physical node (since there is only one physical node), the first logical node LN1 is mapped to Node 1 and the second logical node LN2 is mapped to Node 2 in FIG. 7B after the training process is resumed with two nodes.

Since the checkpoint maintained by the data loader indicates that the resumption should start with the 1761th sample, the resumption starts with skipping sample ID's mapped to indices 0-879 and 1000-1879, and instead begins from sample ID's mapped to index 880 for logical node LN1 and sample ID's mapped to index 1880 for logical node LN2. The batches for sample ID's mapped to indices 880-999 are constructed by workers of Node 1 and batches for sample ID's mapped to indices 1880-1999 are constructed by workers of Node 2. Moreover, by storing the seed value of the shuffling and using the same seed value when resuming, the same shuffled sample ID array as the previous training process is generated and used to assign batches of sample ID's to workers.

In conventional training systems, the system starts the training process again after a failure but typically there is not a way to quickly determine the batches of samples (and the ordering) that the machine-learning model has processed already. One way was to calculate the number of samples the model had already seen based on the number of devices and batch size at each iteration, and loop over the data loader class until the data loader hit samples the model had not processed yet. This process could take up to minutes or even tens of minutes, and required the user to maintain custom code and likelihood of training on duplicate samples was high. By performing elastic resumption based on deterministic ordering as described herein, training can quickly resume by simply maintaining a count of the number of samples (or batches, global batches) that have already been loaded, saving significant computational resources compared to prior art methods.

Mixing of Multiple Data Streams

In some embodiments, the streaming dataset object in the data processing service 102 may access one or more data files from one or more data streams. In one instance, one or more data files stored in the same or different locations from one another. Further, the proportions of samples from different sources are adjusted to account for issues such as disproportionate bias, and the like. In some embodiments, the streaming dataset object described herein may aggregate and mix the samples from multiple data streams, such that the user does not have to manually write code or maintain separate datasets with the desired sample proportions for training.

In one implementation, the overall dataset combines samples from all or some input streams, for example, two or more streams. In one embodiment, the streaming dataset object downloads the index.json files for each input stream and extracts the number of shard files per stream and the number of samples per shard file. For example, the streaming dataset object may determine exactly which samples are in which input streams and shard files without having to download the shard files. In one instance, the samples in data streams can be upsampled or downsampled, enabling more control over stream mixing and final dataset composition. When a given data stream is upsampled, one or more redundant samples are added to the data stream to augment the samples of the data stream. When a given data stream is downsampled, a subset of samples from the data set are selected for training to downsize the contribution of the data stream.

In one embodiment, as described in further detail below, the streaming dataset object provides a simplified framework for constructing batches of samples from multiple data streams for training the machine-learning model. Moreover, the user can provide a desired proportion or absolute number of samples for each respective data stream that indicates how the batches should be constructed to reflect the relative contribution of samples from each data stream. The composition of the batches depends on which mixing method (described below) is selected.

Random Batching

In one embodiment, the data streams are mixed together to form an aggregated data stream. The index.json file for each data stream is downloaded and the number of samples across the two or more datasets are aggregated. Similar to that described above, a first mapping that maps sample IDs to shard files for the first stream and a second mapping that maps sample IDs to shard file for the second stream is created. In one embodiment, there is also a mapping of shard IDs to stream IDs, so that for a given sample, the shard containing the sample can be identified and the stream that the shard is contained in can be identified. In one embodiment, to adjust the relative proportion of samples between the data streams, the streaming dataset object may perform upsampling or downsampling to adjust the sample size of a data stream and create a new sample ID array for the data stream. For example, if a user requested a 2:1 ratio of samples from a first data stream containing 1,000 samples to a second data stream containing 1,000 samples, the streaming dataset object will have to upsample the first data stream by a factor of two. The streaming dataset object adjusts the sample size for the upsampled first data stream to 2,000 samples. The streaming dataset object creates an updated sample ID array for the first data stream, where for example, a sample with ID S0001 from the first data stream in Shard 01 may be replicated twice to Sample S0001_A and Sample S0001_B.

The streaming dataset object aggregates the samples across the two or more data streams into one aggregated data stream. The streaming dataset object determines an aggregated sample index (e.g., indices 0 to 2999 combining upsampled first stream and second stream above) and generates a partition tensor based on the aggregated sample index. If shuffling is performed, the samples in the aggregated stream are used as an aggregated sample ID array and shuffled, similar to the process described in FIG. 6-8E. The resulting shuffled sample ID array is used to map sample indices in the partition tensor to the shuffled sample ID's from the aggregated stream to construct the batches for each worker. While the random batching method does not guarantee the relative proportion of samples within each batch, the stream proportions may hold in aggregate over the course of training.

In one embodiment, the streaming dataset object is configured to (1) adjust the proportion of training examples in the aggregated stream across the different data streams, (2) adjust the upsampling or downsampling of training samples in the data streams, or (3) select a subset of samples in a data stream for training according to requests by the user. In another embodiment, the streaming dataset object may specify the sampling method when initiating the data streams. For example, the streaming dataset object may select samples randomly from the streaming datasets during each epoch according to the desired proportions.

Stratified Batching

In one embodiment, a stratified mixing method is performed where the desired relative proportions between data streams are maintained within a batch of samples. In such an embodiment, the streaming dataset object obtains a respective sample ID array for each data stream that is upsampled or downsampled as desired. The sample index for each data stream is partitioned across the nodes, devices per node, workers per device, batches per worker, and sample size of a batch to generate a partition tensor for each stream. In particular, the partition tensor for each stream is constructed such that the number of samples per batch for the stream corresponds to the stream proportion. For example, if a user requested a 2:1 ratio of samples from a first data stream containing 2,000 samples (including upsampled samples) to a second data stream containing 1,000 samples, the ratio of the number of samples per batch in the partition tensor for the first stream to the number of samples per batch in the partition tensor for the second stream may be 2:1.

In some implementations, a global batch size is divided up between data streams in the ratio required. In one example, with a global batch size of 60 samples, the first stream would provide 40 samples per global batch, and the second stream would provide 20 samples per global batch. After the partition tensor for each stream is generated, the partition tensors may be concatenated and reshaped to form the final sample partition. In one example, the partition for Stream 1 would have a global batch size of 40, and the partition for Stream 2 would have a global batch size of 20. When concatenating these two partitions to get a final batch with a global batch size of 60, the global batch of samples may be divided among device batches per node/rank/worker.

For each data stream, the streaming dataset object shuffles the sample ID array for the stream according to any of the methods described in conjunction with FIGS. 8A-8E. The shuffled sample ID array for each data stream is used to map sample indices in the per stream partition tensor to the shuffled sample ID's for the stream. The streaming dataset object constructs batches for each worker by aggregating the sample ID's assigned to the worker across each stream. In this manner, the stream proportion is maintained within a batch.

Per Stream Batching

In one embodiment, a per stream mixing method is performed where the samples for a global batch of an iteration are only samples from one data stream. In such an embodiment, the streaming dataset object obtains a respective sample ID array for each data stream that is upsampled or downsampled as desired. The sample index for each data stream is partitioned across the nodes, devices per node, workers per device, batches per worker, and sample size of a batch to generate the per stream partition tensor. In particular, the per stream partition tensors are constructed such that in aggregate, the stream proportions still hold, but a global batch for one iteration is constructed using samples from one data stream.

For each data stream, the streaming dataset object shuffles the sample ID array for the stream according to any of the methods described in conjunction with FIGS. 8A-8E. The shuffled sample ID array for each data stream is used to map indices in the per stream partition tensor to the shuffled sample ID's for the stream. The ordering of global batches for one or more iterations are constructed by interleaving the partitions generated for each data stream, such that a given global batch has samples from a select data stream(s) for a given iteration.

Process of Sample Downloads Using Disjoint Shard Files

Figure 9A:
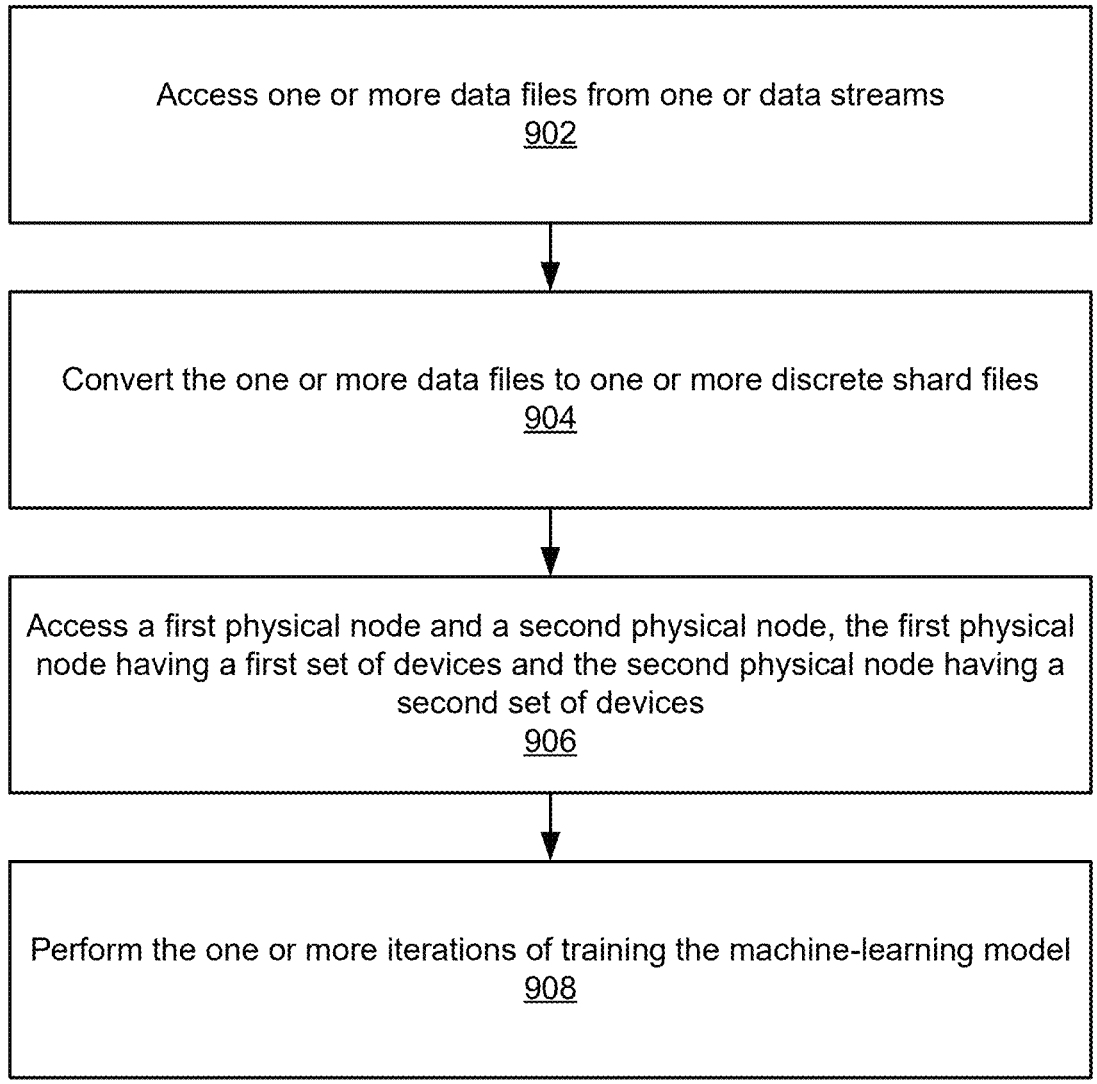
FIG. 9A is a flowchart of a method for downloading samples using disjoint shard files, in accordance with an embodiment.

FIG. 9A is a flowchart of a method for downloading samples using disjoint shard files, in accordance with an embodiment. The process shown in FIG. 9A may be performed by one or more components (e.g., the control layer 106) of a data processing system/service (e.g., the data processing service 102). Other entities may perform some or all of the steps in FIG. 9A. The data processing service 102 as well as the other entities may include some or of the component of the machine (e.g., computer system) described in conjunction with FIG. 10. Embodiments may include different and/or additional steps, or perform the steps in different orders.

As shown in FIG. 9A, the data processing service 102 accesses 902 one or more data files from one or more data streams. Each data file may include a plurality of samples that are to be processed over one or more iterations of training a machine-learning model. In some embodiments, each sample is assigned with a sample ID that identifies the specific sample. The data processing service 102 converts 904 the one or more data files to one or more discrete shard files. Each shard file includes a respective subset of samples from the plurality of samples. Each sample ID is mapped to a shard index of a respective shard file that includes the sample. In some embodiments, the data processing service 102 may also generate a metadata file describing the one or more shard files. The metadata file may include the shard index of each shard file and the sample ID of each sample in the respective shard file. The data processing service 102 may access 906 a first physical node and a second physical node. The first physical node has a first set of devices and the second physical node has a second set of devices. Each device is associated with one or more workers. The data processing service 102 performs 908 the one or more iterations of training the machine-learning model. During the training process, workers of the first physical node download a first subset of shard files and workers of the second physical node download a second subset of shard files, and the first subset of shard files are disjoint from the second subset of shard files.

Process of Sample Shuffling

Figure 9B:
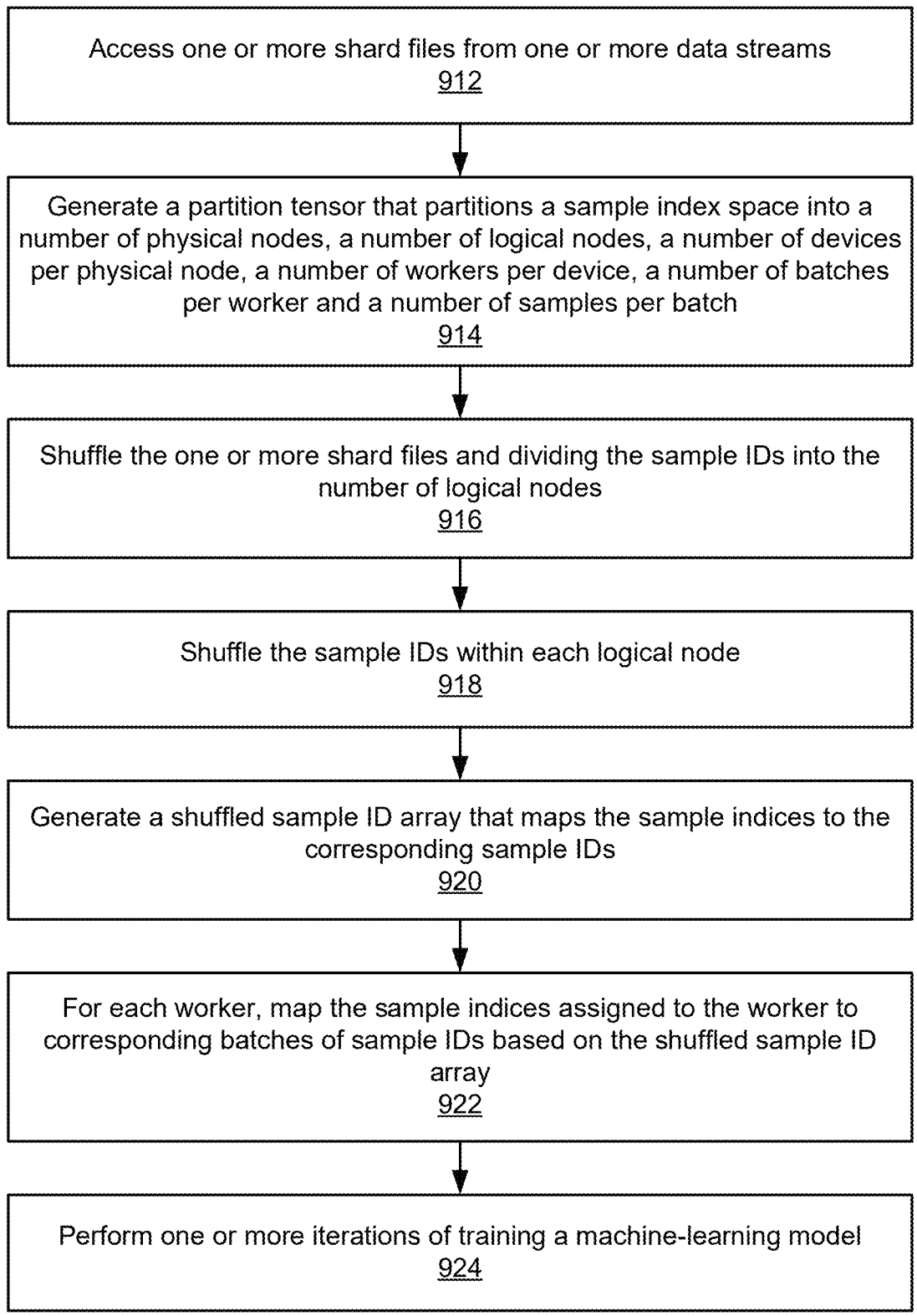
FIG. 9B is a flowchart of a method of a sample shuffling process, in accordance with an embodiment.

FIG. 9B is a flowchart of a method of a sample shuffling process, in accordance with an embodiment. The process shown in FIG. 9B may be performed by one or more components (e.g., the control layer 106) of a data processing system/service (e.g., the data processing service 102). Other entities may perform some or all of the steps in FIG. 9B. The data processing service 102 as well as the other entities may include some or of the component of the machine (e.g., computer system) described in conjunction with FIG. 10. Embodiments may include different and/or additional steps, or perform the steps in different orders.

As shown in FIG. 9B, the data processing service 102 may access 912 one or more shard files from one or more data streams. Each shard file may include a plurality of samples, each sample may have a sample ID, and each sample ID is mapped to a shard index of a respective shard file that includes the sample. The data processing service 102 generates 914 a partition tensor that partitions a sample index space into a number of physical nodes, a number of logical nodes, a number of devices per physical node, a number of workers per device, a number of batches per worker and a number of samples per batch. The partition tensor assigns each worker batches of sample indices. The data processing service 102 shuffles 916 the one or more shard files and divides the sample IDs into the number of logical nodes. The data processing service 102 shuffles 918 the sample IDs within each logical node and generates 920 a shuffled sample ID array that maps the sample indices to the corresponding sample IDs. For each worker, the data processing service 102 maps 922 the sample indices assigned to the worker to corresponding batches of sample IDs based on the shuffled sample ID array, and performs 924 one or more iterations of training a machine-learning model. During the training process, the workers access the assigned samples by downloading shard files that contain specific sample IDs.

Process of Sample Mixing

Figure 9C:
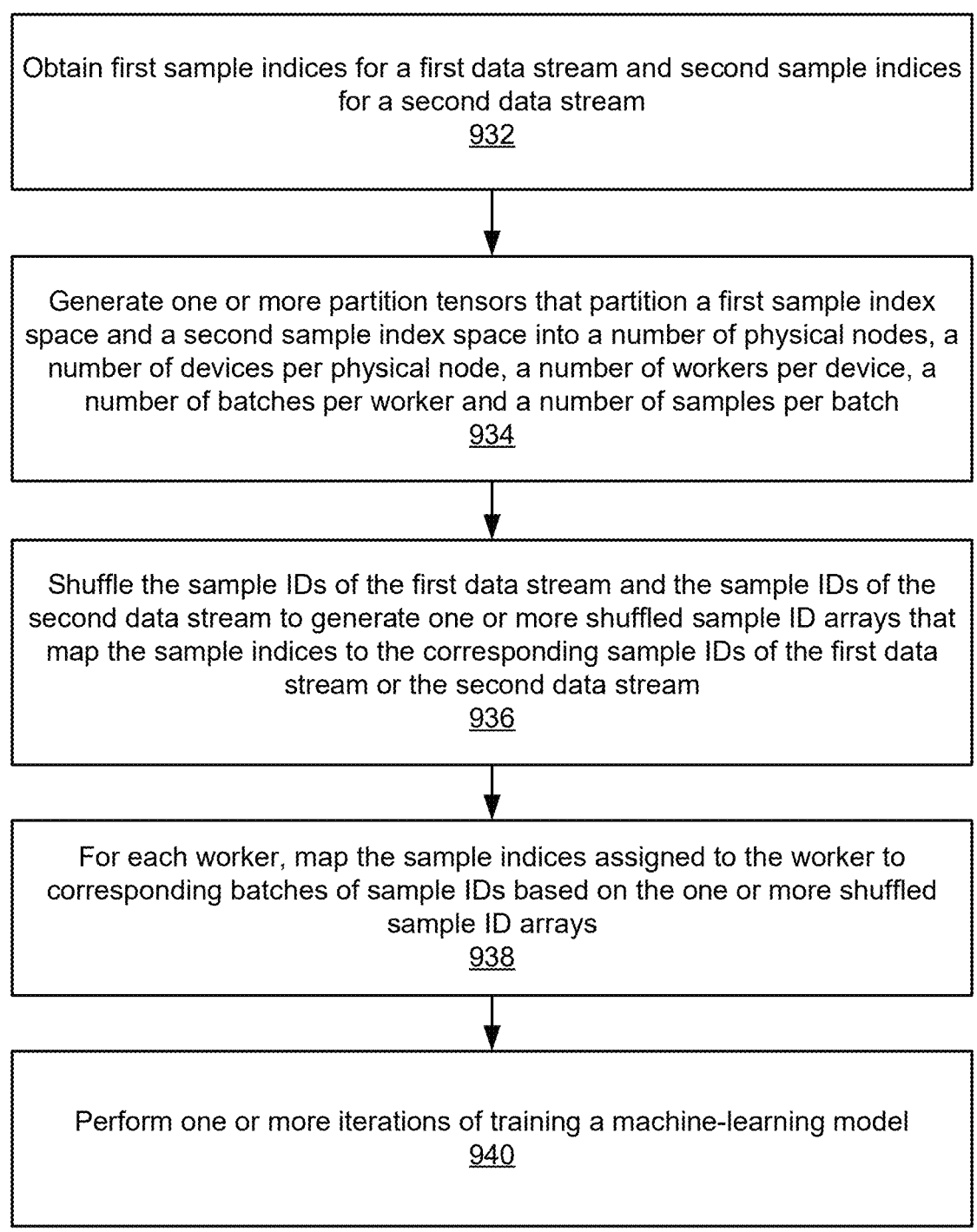
FIG. 9C is a flowchart of a method for mixing samples from one or more data streams, in accordance with an embodiment.

FIG. 9C is a flowchart of a method for mixing samples from one or more data streams, in accordance with an embodiment. The process shown in FIG. 9C may be performed by one or more components (e.g., the control layer 106) of a data processing system/service (e.g., the data processing service 102). Other entities may perform some or all of the steps in FIG. 9C. The data processing service 102 as well as the other entities may include some or of the component of the machine (e.g., computer system) described in conjunction with FIG. 10. Embodiments may include different and/or additional steps, or perform the steps in different orders.

As shown in FIG. 9C, the data processing service 102 obtains 932 first sample indices for a first data stream and second sample indices for a second data stream. The data processing service 102 may generate 934 one or more partition tensors that partition a first sample index space and a second sample index space into a number of physical nodes, a number of devices per physical node, a number of workers per device, a number of batches per worker and a number of samples per batch. The one or more partition tensors assign each worker batches of sample indices from both the first data stream and the second data stream. In some embodiments, the data processing service 102 may perform an upsampling or downsampling operation by adjusting a ratio between the first sample index and the second sample index. The data processing service 102 may shuffle 936 the sample IDs of the first data stream and the sample IDs of the second data stream to generate one or more shuffled sample ID arrays that map the sample indices to the corresponding sample IDs of the first data stream or the second data stream. For each worker, the data processing service 102 maps 938 the sample indices assigned to the worker to corresponding batches of sample IDs based on the one or more shuffled sample ID arrays. The data processing service 102 performs 940 one or more iterations of training a machine-learning model. During the training process, the workers download the assigned samples with the sample IDs.

Figure 10:
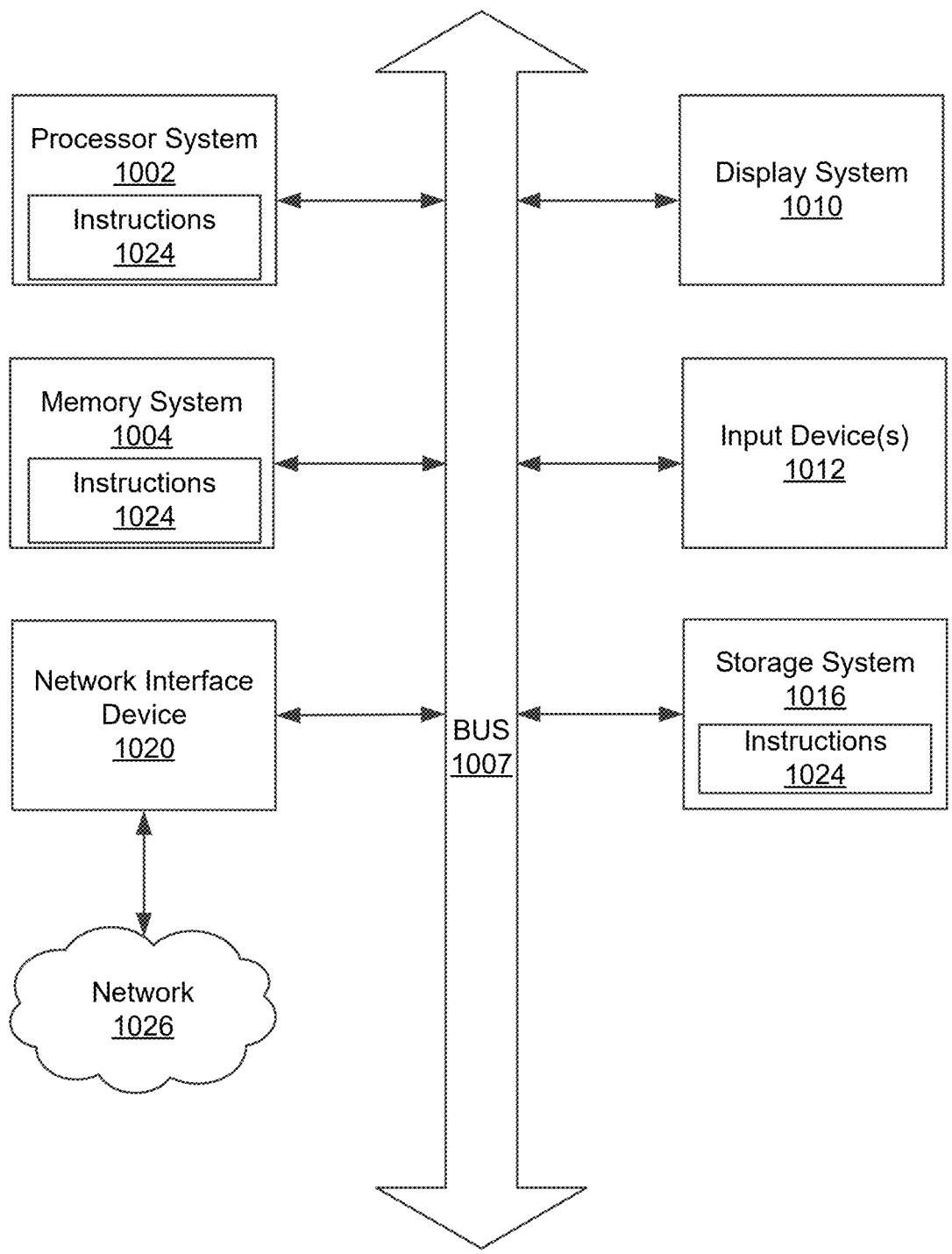
FIG. 10 is a block diagram illustrating an example machine to read and execute computer readable instructions, in accordance with an embodiment.

Turning now to FIG. 10, illustrated is an example machine to read and execute computer readable instructions, in accordance with an embodiment. Specifically, FIG. 10 shows a diagrammatic representation of the data processing service 102 (and/or data processing system) in the example form of a computer system 1000. The computer system 1000 is structured and configured to operate through one or more other systems (or subsystems) as described herein. The computer system 1000 can be used to execute instructions 1024 (e.g., program code or software) for causing the machine (or some or all of the components thereof) to perform any one or more of the methodologies (or processes) described herein. In executing the instructions, the computer system 1000 operates in a specific manner as per the functionality described. The computer system 1000 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 1000 may be a server computer, a client computer, a personal computer (PC), a tablet PC, a smartphone, an internet of things (IoT) appliance, a network router, switch or bridge, or other machine capable of executing instructions 1024 (sequential or otherwise) that enable actions as set forth by the instructions 1024. Further, while only a single machine is illustrated, the term "machine" shall also be taken to include any collection of machines that individually or jointly execute instructions 1024 to perform any one or more of the methodologies discussed herein.

The example computer system 1000 includes a processor system 1002. The processor system 1002 includes one or more processors. The processor system 1002 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor system 1002 executes an operating system for the computing system 1000. The computer system 1000 also includes a memory system 1004. The memory system 1004 may include or more memories (e.g., dynamic random access memory (RAM), static RAM, cache memory). The computer system 1000 may include a storage system 1016 that includes one or more machine readable storage devices (e.g., magnetic disk drive, optical disk drive, solid state memory disk drive).

The storage unit 1016 stores instructions 1024 (e.g., software) embodying any one or more of the methodologies or functions described herein. For example, the instructions 1024 may include instructions for implementing the functionalities of the transaction module 330. The instructions 1024 may also reside, completely or at least partially, within the memory system 1004 or within the processing system 1002 (e.g., within a processor cache memory) during execution thereof by the computer system 1000, the main memory 1004 and the processor system 1002 also constituting machine-readable media. The instructions 1024 may be transmitted or received over a network 1026, such as the network 1026, via the network interface device.

The storage system 1016 should be taken to include a single medium or multiple media (e.g., a centralized or distributed database, or associated caches and servers communicatively coupled through the network interface system) able to store the instructions 1024. The term "machine-readable medium" shall also be taken to include any medium that is capable of storing instructions 1024 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 1000 can include a display system 1010. The display system 1010 may driver firmware (or code) to enable rendering on one or more visual devices, e.g., drive a plasma display panel (PDP), a liquid crystal display (LCD), or a projector. The computer system 1000 also may include one or more input/output systems 1012. The input/output (IO) systems 1012 may include input devices (e.g., a keyboard, mouse (or trackpad), a pen (or stylus), microphone) or output devices (e.g., a speaker). The computer system 1000 also may include a network interface system 1007. The network interface system may include one or more network devices that are configured to communicate with an external network 1026. The external network 1026 may be a wired (e.g., ethernet) or wireless (e.g., WiFi, BLUETOOTH, near field communication (NFC).

The processor system 1002, the memory system 1004, the storage system 1016, the display system 1010, the IO systems 1012, and the network interface system are communicatively coupled via a computing bus.

Additional Considerations

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method, comprising:
    accessing one or more data files from one or more data streams, each data file including a plurality of samples, the samples to be processed over one or more iterations of training a machine-learning model, each sample having a sample ID;
    converting the one or more data files to one or more discrete shard files, each shard file in the one or more shard files comprising a respective subset of samples from the plurality of samples, wherein each sample ID is mapped to a shard index of a respective shard file that includes the sample;
    accessing a first physical node and a second physical node, the first physical node having a first set of devices and the second physical node having a second set of devices, wherein each device is associated with two or more CPU workers; and
    performing the one or more iterations of training the machine-learning model, wherein during the training, CPU workers of the first physical node download a first subset of shard files and CPU workers of the second physical node download a second subset of shard files, and the first subset of shard files are disjoint from the second subset of shard files, performing the one or more iterations of training further comprising:
        for an iteration, loading batches of samples assigned to the first set of devices and the second set of devices for the iteration by a first subset of CPU workers,
        processing the batches of samples by the first set of devices and the second set of devices to update parameters of the machine-learning model,
        for a next iteration, loading another batches of samples assigned to the first set of devices and the second set of devices for the next iteration by a second subset of CPU workers, wherein the second subset of CPU workers are different from the first subset of CPU workers, and
        processing the another batches of samples by the first set of devices and the second set of devices to update the parameters of the machine-learning model.

2. The method of claim 1, further comprising:
    generating a metadata file describing the one or more shard files, the metadata file comprising the shard index of each shard file and the sample ID of each sample in the respective shard file.

3. The method of claim 1, wherein converting the one or more data files to one or more discrete shard files comprises:
    serializing the samples in the respective subset of samples in a binary format in each shard file.

4. The method of claim 1, wherein performing the one or more iterations of training the machine-learning model comprises:
    for an iteration of the training, instructing each CPU worker in each device to obtain a batch of samples assigned to the CPU worker for the iteration;
    identifying shard indices for the assigned batch of samples based on a mapping between sample IDs and the shard indices; and
    downloading shard files based on the identified shard indices for training the machine-learning model.

5. The method of claim 1, wherein performing the one or more iterations of training the machine-learning model comprises:

for an iteration of training, instructing a first CPU worker of the first physical node to download a shard file that includes a first sample assigned to the first CPU worker;
during a subsequent iteration of training, identifying a second sample assigned to a second CPU worker of the first physical node, wherein the second sample is included in a same shard file as the first sample; and
instructing the second CPU worker of the first physical node to obtain the second sample from the shard file downloaded by the first CPU worker.

6. The method of claim 1, wherein performing the one or more iterations of training the machine-learning model comprises:
during each iteration of training, assigning a first batch of samples to one CPU worker of the first physical node and a second batch of samples to one CPU worker of the second physical node.

7. The method of claim 1, wherein the one or more data files include one or more of image, text, video, and multimodal data.

8. A non-transitory computer-readable medium comprising stored instructions that when executed by one or more processors of one or more computing devices, cause the one or more computing devices to:
access one or more data files from one or data streams, each data file including a plurality of samples, the samples to be processed over one or more iterations of training a machine-learning model, each sample having a sample ID;
convert the one or more data files to one or more discrete shard files, each shard file comprising a respective subset of samples from the plurality of samples, wherein each sample ID is mapped to a shard index of a respective shard file that includes the sample;
access a first physical node and a second physical node, the first physical node having a first set of devices and the second physical node having a second set of devices, wherein each device is associated with two or more workers; and
perform the one or more iterations of training the machine-learning model, wherein during the training, CPU workers of the first physical node download a first subset of shard files and CPU workers of the second physical node download a second subset of shard files, and the first subset of shard files are disjoint from the second subset of shard files, wherein the instructions further cause the one or more computing devices to:
for an iteration, load batches of samples assigned to the first set of devices and the second set of devices for the iteration by a first subset of CPU workers,
process the batches of samples by the first set of devices and the second set of devices to update parameters of the machine-learning model,
for a next iteration, load another batches of samples assigned to the first set of devices and the second set of devices for the next iteration by a second subset of CPU workers, wherein the second subset of CPU workers are different from the first subset of CPU workers, and
process the another batches of samples by the first set of devices and the second set of devices to update the parameters of the machine-learning model.

9. The non-transitory computer-readable medium of claim 8, wherein the instructions further cause the one or more computing devices to:
generate a metadata file describing the one or more shard files, the metadata file comprising the shard index of each shard file and the sample ID of each sample in the respective shard file.

10. The non-transitory computer-readable medium of claim 8, wherein the instructions to convert the one or more data files to one or more discrete shard files further cause the one or more computing devices to:
serialize the samples in the respective subset of samples in a binary format in each shard file.

11. The non-transitory computer-readable medium of claim 8, wherein the instructions to perform the one or more iterations of training the machine-learning model further cause the one or more computing devices to:
for an iteration of the training, instruct each CPU worker in each device to obtain a batch of samples assigned to the CPU worker for the iteration;
identify shard indices for the assigned batch of samples based on a mapping between sample IDs and the shard indices; and
download shard files based on the identified shard indices for training the machine-learning model.

12. The non-transitory computer-readable medium of claim 8, wherein the instructions to perform the one or more iterations of training the machine-learning model further cause the one or more computing devices to:
for an iteration of training, instruct a first CPU worker of the first physical node to download a shard file that includes a first sample assigned to the first CPU worker;
during a subsequent iteration of training, identify a second sample assigned to a second CPU worker of the first physical node, wherein the second sample is included in a same shard file as the first sample; and
instruct the second CPU worker of the first physical node to obtain the second sample from the shard file downloaded by the first CPU worker.

13. The non-transitory computer-readable medium of claim 8, wherein the instructions to perform the one or more iterations of training the machine-learning model further cause the one or more computing devices to:
during each iteration of training, assign a first batch of samples to one CPU worker of the first physical node and a second batch of samples to one CPU worker of the second physical node.

14. The non-transitory computer-readable medium of claim 8, wherein the one or more data files include one or more of image, text, video, and multimodal data.

15. A system comprising:
one or more computer processors; and
one or more computer-readable mediums storing instructions that, when executed by the one or more computer processors, cause the system to:
access one or more data files from one or data streams, each data file including a plurality of samples, the samples to be processed over one or more iterations of training a machine-learning model, each sample having a sample ID;
convert the one or more data files to one or more discrete shard files, each shard file comprising a respective subset of samples from the plurality of samples, wherein each sample ID is mapped to a shard index of a respective shard file that includes the sample;
access a first physical node and a second physical node, the first physical node having a first set of devices and the second physical node having a second set of devices, wherein each device is associated with two or more workers; and perform the one or more iterations of training the machine-learning model, wherein during the training, CPU workers of the first physical node download a first subset of shard files and CPU workers of the second physical node download a second subset of shard files, and the first subset of shard files are disjoint from the second subset of shard files, wherein the instructions further cause the system to:

for an iteration, load batches of samples assigned to the first set of devices and the second set of devices for the iteration by a first subset of CPU workers, process the batches of samples by the first set of devices and the second set of devices to update parameters of the machine-learning model, for a next iteration, load another batches of samples assigned to the first set of devices and the second set of devices for the next iteration by a second subset of CPU workers, wherein the second subset of CPU workers are different from the first subset of CPU workers, and process the another batches of samples by the first set of devices and the second set of devices to update the parameters of the machine-learning model.

16. The system of claim 15, wherein the instructions further cause the system to:

generate a metadata file describing the one or more shard files, the metadata file comprising the shard index of each shard file and the sample ID of each sample in the respective shard file.

17. The system of claim 15, wherein the instructions to convert the one or more data files to one or more discrete shard files further cause the system to:

serialize the samples in the respective subset of samples in a binary format in each shard file.

18. The system of claim 15, wherein the instructions to perform the one or more iterations of training the machine-learning model further cause the system to:

for an iteration of the training, instruct each CPU worker in each device to obtain a batch of samples assigned to the CPU worker for the iteration;

identify shard indices for the assigned batch of samples based on a mapping between sample IDs and the shard indices; and download shard files based on the identified shard indices for training the machine-learning model.

19. The system of claim 15, wherein the instructions to perform the one or more iterations of training the machine-learning model further cause the system to:

for an iteration of training, instruct a first CPU worker of the first physical node to download a shard file that includes a first sample assigned to the first CPU worker;

during a subsequent iteration of training, identify a second sample assigned to a second worker of the first physical node, wherein the second sample is included in a same shard file as the first sample; and instruct the second CPU worker of the first physical node to obtain the second sample from the shard file downloaded by the first CPU worker.

20. The system of claim 15, wherein the instructions to perform the one or more iterations of training the machine-learning model further cause the system to:

during each iteration of training, assign a first batch of samples to one CPU worker of the first physical node and a second batch of samples to one CPU worker of the second physical node.

* * * * *

UNITED STATES PATENT AND TRADEMARK OFFICE
CERTIFICATE OF CORRECTION

| | | |
|---|---|---|
| PATENT NO. | : 12,399,865 B1 | Page 1 of 1 |
| APPLICATION NO. | : 18/753859 | |
| DATED | : August 26, 2025 | |
| INVENTOR(S) | : Knighton et al. | |

It is certified that error appears in the above-identified patent and that said Letters Patent is hereby corrected as shown below:

In the Claims

In Column 27, in Claim 8, Line 27, delete "one or data" and insert -- one or more data --, therefor.

In Column 28, in Claim 15, Line 55, delete "one or data" and insert -- one or more data --, therefor.

Signed and Sealed this
Twenty-eighth Day of October, 2025

John A. Squires
*Director of the United States Patent and Trademark Office*